United States Patent
Takei et al.

(10) Patent No.: US 8,811,278 B2
(45) Date of Patent: Aug. 19, 2014

(54) LOW/HIGH FREQUENCY SHARED LEAKAGE ANTENNA, BASE STATION APPARATUS AND CLOSE-RANGE DETECTION SYSTEM USING THE ANTENNA

(75) Inventors: Ken Takei, Kawasaki (JP); Kazuo Tamura, Mita (JP); Nobuaki Kitano, Hitachi (JP); Seiichi Kashimura, Hitachi (JP); Hiroyuki Hori, Asaka (JP); Yasuo Ishikawa, Fukuoka (JP)

(73) Assignees: Hitachi, Ltd., Tokyo (JP); Hitachi Metals, Ltd., Tokyo (JP)

( * ) Notice: Subject to any disclaimer, the term of this patent is extended or adjusted under 35 U.S.C. 154(b) by 869 days.

(21) Appl. No.: 13/019,799

(22) Filed: Feb. 2, 2011

(65) Prior Publication Data

US 2011/0199920 A1    Aug. 18, 2011

(30) Foreign Application Priority Data

Feb. 3, 2010 (JP) .................... 2010-022118
Aug. 19, 2010 (JP) .................... 2010-183564

(51) Int. Cl.
*H04W 4/00* (2009.01)
*H01Q 21/00* (2006.01)
*H01Q 1/50* (2006.01)

(52) U.S. Cl.
USPC ............... 370/328; 343/728; 343/852

(58) Field of Classification Search
None
See application file for complete search history.

(56) References Cited

U.S. PATENT DOCUMENTS

| | | | |
|---|---|---|---|
| 3,693,103 A * | 9/1972 | Mouw | 324/95 |
| 2005/0133597 A1* | 6/2005 | Aoki et al. | 235/451 |
| 2008/0191699 A1* | 8/2008 | Gauss et al. | 324/322 |
| 2011/0102283 A1* | 5/2011 | Chang et al. | 343/749 |

FOREIGN PATENT DOCUMENTS

| | | | |
|---|---|---|---|
| JP | 48-058748 A | | 8/1973 |
| JP | 51-021417 A | | 2/1976 |
| JP | 55-051086 Y2 | | 11/1980 |
| JP | 2007-199967 A | | 8/2007 |
| JP | 2007-243821 A | | 9/2007 |
| JP | 2009-004986 A | | 1/2009 |

OTHER PUBLICATIONS

Office Action dated Aug. 6, 2013, in Japanese Patent Application No. 2010-183564.
Natarajan et al. "Security for Energy constrained RFID System" Automatic Identification Advanced Technologies, 2005, Fourth IEEE Workshop on Oct. 17-18, 2005, pp. 181-186.
Office Action issued Apr. 2, 2013, in Chinese Patent Application No. 201110035469.5.

* cited by examiner

*Primary Examiner* — Jutai Kao
(74) *Attorney, Agent, or Firm* — Miles & Stockbridge P.C.

(57) ABSTRACT

The present invention provides a high/low frequency dual wireless location detection and information transmission system which is high in reliability and maintainability, and can be easily installed.
A leakage coaxial inner conductor and a conductor line provided in parallel are short-circuited at an end, a single leakage coaxial operation and a loop operation of the inner conductor and the conductor line are performed at the same time, the ID of a tag is communicated using magnetic fields which locally exist near the conductor line by the loop, and wireless position detection and information communications which are less affected by the influence of ambient environments due to electromagnetic waves in a closed area are realized by open-type lines.

20 Claims, 19 Drawing Sheets

COMPARISON EXAMPLE

| ADDRESS | TAG ID | BASE STATION ID | MEASUREMENT FLAG | REPLY DELAY TIME |
|---|---|---|---|---|
| 1 | | | | |
| 2 | | | | |
| ⋮ | | | | |

LOW/HIGH FREQUENCY SHARED LEAKAGE ANTENNA, BASE STATION APPARATUS AND CLOSE-RANGE DETECTION SYSTEM USING THE ANTENNA

CLAIM OF PRIORITY

The present application claims priority from Japanese Patent Applications JP 2010-022118 filed on Feb. 3, 2010 and JP 2010-183564 filed on Aug. 19, 2010, those contents of which are hereby incorporated by reference into this application.

FIELD OF THE INVENTION

The present invention relates to a low/high frequency shared leakage antenna, a base station apparatus and a close-range detection system using the antenna which detect whether or not an object exists using electromagnetic waves, and particularly to a low/high frequency shared leakage antenna, a base station apparatus and a detection system using the antenna which improve detection accuracy in a limited area where an object to be detected exists and are suitable for reducing the probability of false detection outside the limited area.

BACKGROUND OF THE INVENTION

As a conventional technique related to RFID, there has been known a technique called semi-active RFID in which electromagnetic waves in two kinds of frequency bands are used, and the power switch of a terminal station having a power source such as a battery is turned on/off to reduce the power consumption of the terminal station used for communications as small as possible using the electromagnetic waves that can be reached far with less electric power (for example, refer to V. Natarajan et al, "Security for energy constrained RFID system" Automatic Identification Advanced Technologies, 2005, Fourth IEEE Workshop on 17-18 Oct. 2005 pp 181-186). In addition, Japanese Patent Application Laid-Open publication No. 2007-199967 discloses a technique using radio waves in the RF band not only when detecting the presence or absence of an object in the same area, but also identifying the position of the object. Further, Japanese Patent Application Laid-Open Publication No. 2007-243821 discloses a technique in which a leakage coaxial cable is used as an antenna of a wireless tag and the leakage coaxial cable is laid in a branching-structure shape.

SUMMARY OF THE INVENTION

Usage of electromagnetic waves enables noncontact and remote communications. There has been widely known a technique for remotely detecting the presence or absence of an object using the communication function. Together with the progress of the semiconductor technology in recent years, a system called RFID has been widely prevailing in society. As similar to a general wireless system, RFID is configured using base stations and terminal stations. Some terminal stations are equipped with power sources and others are not. The former terminal station is called active RFID and the latter terminal station is called passive RFID. In the former case, the terminal station can radiate high-power electromagnetic waves, and enables communications at a far distance of a few meters to ten meters. However, the life-cycle of the battery as a power source is short ranging from a few days to a few weeks in the current technology. Accordingly, there are problems of poor convenience because the battery of the terminal station needs to be exchanged, and low reliability to a long-time operation due to a possibility of interruption of system operations caused by insufficient capacity of the battery when the system is being used. In the latter case, the terminal station enables a long-time operation with high reliability due to no battery. However, the base station needs to supply a power source to the terminal station from outside. Thus, according to the present semiconductor technology, especially the characteristic limit of a rectifier, the terminal station can secure the power source stably only when several centimeters or less communication distance.

In order to address these problems, a technique called semi-active RFID has been proposed. In this technique, electromagnetic waves in two kinds of frequency bands are used, and the power switch of a terminal station having a power source such as a battery is turned on/off to reduce the power consumption of the terminal station used for communications as small as possible using the electromagnetic waves that can be reached far with less electric power. A large amount of information is transmitted and received using high-frequency electromagnetic waves between the terminal stations and the base stations. While high-frequency electromagnetic waves enable high-speed information transmission, transmission characteristics of electromagnetic waves in a space are deteriorated. The transmission amount is proportional to a frequency, and the attenuation amount is increased with one by the square of the frequency. This technique is described in V. Natarajan at al, "Security for energy constrained RFID system" Automatic Identification Advanced Technologies, 2005, Fourth IEEE Workshop on 17-18 Oct. 2005 pp 181-186.

The operation of turning on or off the power source of the terminal station can be performed with a small amount of information. In order to transmit the information far with less electric power without generating a so-called blind zone in propagation caused by interference of plural waves, such as reflected waves, each having an incoming phase difference of about a half-wavelength, it is desirable to use low-frequency electromagnetic waves. It is convenient to use electromagnetic waves in a so-called LF band of several hundreds of kHz. The wavelength of the electromagnetic wave with several hundreds of kHz is extremely longer (several tens of meters) than that used in a normal wireless device. It is not necessary to consider the interference of plural waves each having an incoming phase difference of about a half-wavelength. However, a wavelength of a fraction that is necessary for securing excellent sensitivity as an antenna cannot be secured. Therefore, it is necessary to use an induction field among electromagnetic wave components, and there is a general restriction to use an antenna having a loop structure surrounding an area where radio waves in the LF band are transmitted and received.

On the other hand, information is currently transmitted and received at a frequency of a few Mbps or higher in general with an increasing amount of information handled by a wireless system, and radio waves in the RF band having a frequency of several hundreds of MHz or higher are used as electromagnetic waves. The wavelength of the fraction of the electromagnetic wave for the antenna in the RF band corresponds to a few centimeters to several tens of centimeters, and thus the antenna can be easily realized by a small antenna without a loop structure such as a dipole. In the semi-active RFID, it is necessary to transmit and receive these two different bands of low and high frequencies. The terminal station needs to be realized with a small dimension, and thus it is necessary to mount an antenna in consideration of a dimension at the expense of efficiency. Therefore, it is necessary to realize a high-efficiency antenna at any frequencies in the base station. In general, it is necessary to install two kinds of antennas such as an antenna having a loop structure for a low frequency band and a dipole antenna for a high frequency band, leading to a problem of complicated system configurations.

As such a system using the loop antenna surrounding an area where radio waves in the LF band are transmitted and received, there has been known a technique disclosed in Japanese Patent Application Laid-Open Publication No. 2007-199967 in which in order to exhibit an excellent value of the sensitivity of the loop antenna in the area, radio waves in the RF band are used not only when detecting the presence or absence of an object existing in the area, but also when identifying the position of the object. The electromagnetic waves can identify the existing area in wavelength order. Thus, it is possible in principle to identify the object with a resolution of a few meters to several tens of centimeters by using radio waves in the RF band.

In a general technique disclosed in Japanese Patent Application Laid-Open Publication No. 2007-199967, plural wireless reception stations are installed at different locations at distances corresponding to the wavelengths or longer of radio waves in the RF band, and simultaneously receive radio waves transmitted from an object to identify the location by calculation using the principle of triangulation. In this method, if there is an object that reflects radio waves in the RF band around the wireless reception stations, line-of-sight reception of direct waves that is necessary for realization of triangulation is not satisfied due to reflected waves of the object, leading to a problem of false identification of the position. Further, three or more wireless stations are needed in the system, and four or more wireless base stations are needed to reduce false detection of the position by the reflected waves, leading to complicated system configurations. In addition, the cost incurred in system installation and operation is considerably increased due to installation of expensive wireless stations.

Further, the technique disclosed in Japanese Patent Application Laid-Open Publication No. 2007-243821 is a system based on conditions under which a specific wireless tag exists in a specific position or area near a leakage coaxial cable in a regular state, and a specific frequency is used for detection of a wireless tag and data communications. The invention disclosed in Japanese Patent Application Laid-Open Publication No. 2007-243821 is not related to a system for realizing position detection of an object using both of a high frequency and a low frequency, and there is no description about a unit for detecting the position of an unspecified wireless tag having free access to a specific position or area near the leakage coaxial cable.

Further, the loop antenna in the low frequency band has high sensitivity in a closed area configured by the loop. Thus, there are problems that a space for detecting an object is limited to the inside of the loop and it is impossible in principle for an object to have free access to a restricted area because the object is physically isolated by the loop.

A purpose of the present invention is to provide a low/high frequency shared leakage antenna, a base station apparatus and a close-range detection system using the antenna in which false position identification of an object using high-frequency radio waves is reduced, wherein the false position identification is caused by reflected waves of high-frequency and low-frequency radio waves generated due to the influence of ambient environments in position identification using both of a high frequency and a low frequency.

Another purpose of the present invention is to provide a low/high frequency shared leakage antenna, a base station apparatus and a close-range detection system using the antenna in which installation of plural wireless stations necessary for identifying the position of an object using high-frequency radio waves is not needed in order to realize detection of the object using both of the high frequency electromagnetic waves and the low frequency radio waves.

Still another object of the present invention is to provide an integrated-structure antenna having excellent sensitivity to high-frequency and low-frequency electromagnetic waves without using a loop that physically isolates an object in order to realize detection of the object using both of the high frequency electromagnetic waves and the low frequency electromagnetic waves.

The following is a representative example of the present invention.

Specifically, the present invention provides a low/high frequency shared leakage antenna including: a high-frequency leakage coaxial cable having an inner conductor and an outer conductor; a termination circuit which terminates the inner conductor and the outer conductor in impedance at one end of the high-frequency leakage coaxial cable; and a loop structure of a conductor line that is arranged near the high-frequency leakage coaxial cable while being in parallel therewith to perform a communication of low-frequency signals, wherein a communication of high-frequency signals higher in frequency than the low-frequency signals is performed through the high-frequency leakage coaxial cable, and wherein the sensitivity of effective sensitivity areas for the low-frequency signals is reduced by the loop structure to allow electromagnetic waves of the low-frequency signals to locally exist around the loop structure.

According to another characteristic of the present invention, the low/high frequency shared leakage antenna has a three-conductor structure configured using the high-frequency leakage coaxial cable formed of the inner conductor and the outer conductor, and the first conductor line.

Further, a close-range detection system of the present invention includes: a base station apparatus having a communication device in which a signal is multiplexed by a high-frequency transmitter circuit and a low-frequency transmitter circuit and the low/high frequency shared leakage antenna; and a wireless tag having a antenna sensitive to the high-frequency signals and the low-frequency signals and a high-frequency receiver circuit and a low-frequency receiver circuit.

According to an aspect of the present invention, communications using an ID provided to the tag can be realized using low-frequency radio waves in the LF band and high-frequency radio waves in the RF band between the wireless tag provided to the object moving closer to the antenna and the base station by the low/high frequency shared leakage antenna having the integrated termination structure and the loop structure. Accordingly, the detection of the position of the object using the wireless tag and the information communications can be realized without additionally installing expensive wireless reception stations. Excellent sensitivity to low-frequency and high-frequency electromagnetic waves can be realized with one antenna. Thus, a remote object detection system using two kinds of electromagnetic waves such as low-frequency and high-frequency electromagnetic waves can be realized with one linear antenna in an open area. Therefore, the degree of freedom in installation of the close-range detection system is advantageously improved and simplification and downsizing of the system hardware are advantageously realized.

DETAILED DESCRIPTION OF THE EMBODIMENT

Figure 1A:
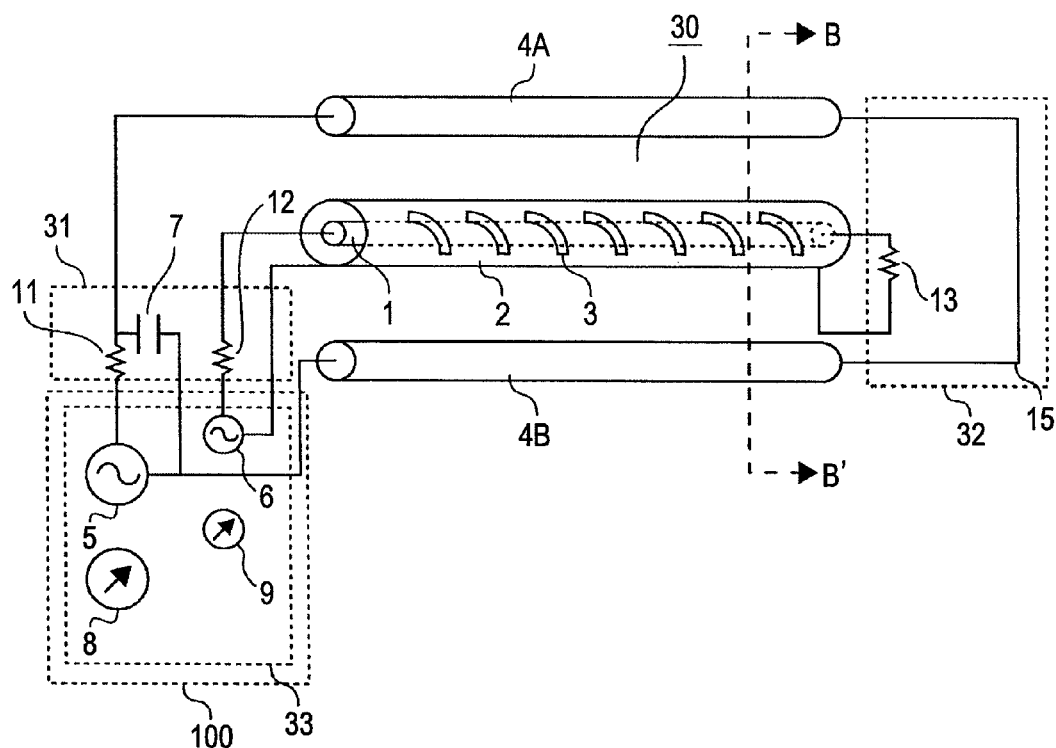
FIG. 1A is a configuration diagram of a base station apparatus including a low/high frequency shared leakage antenna according to a first embodiment of the present invention.

In a system which recognizes an object and detects the position thereof existing in a limited area using low-frequency (for example, a low frequency in the LF band) signals and high-frequency (for example, a high frequency in the RF band) signals, the problem of the present invention can be addressed in such a manner that information of a wireless tag provided to an object is transmitted through a leakage coaxial cable using both of the LF band and the RF band, the sensitivity of effective sensitivity areas in the LF band is intentionally reduced, and the ID of the tag is transmitted using radio waves in the LF band. By reducing the sensitivity of the effective sensitivity areas in the LF band, the electromagnetic energy of electromagnetic waves in the LF band can be allowed to locally exist only around the LF/RF shared leakage coaxial cable. At this time, the electromagnetic energy existing at adjacent areas of the leakage coaxial cable has overwhelmingly-strong induction field components. Thus, the energy neither propagates outside as radiated fields nor moves apart from the adjacent areas of the leakage coaxial cable. As a result, the influence of reflected waves of radiated electromagnetic fields in the ambient environment is eliminated. The object transmits its own ID only when the object exists near the leakage coaxial cable. Thus, it can be at least specified that the position of the object is near the leakage coaxial cable.

Multidimensional position identification can be realized on the basis of the number of leakage coaxial cables. For example, if plural leakage coaxial cables of the present invention are arranged in a mesh shape, two-dimensional position identification can be realized.

It should be noted that the frequency of a low-frequency signal transmitted and received through the transceiver and the closed-loop structure in the present invention ranges from a very low frequency (VLF, 3 KHz to 30 KHz) to a medium frequency (MF, 300 KHz to 3 MHz). On the other hand, the frequency of a high-frequency signal transmitted and received through the leakage coaxial cable ranges from a high frequency (HF, 3 MHz to 30 MHz) to a super high frequency (SHF, 3 GHz to 30 GHz). The optimum frequency band differs depending on applications. As an example of applications to a production line of a plant, a low-frequency (LF) band, and a very high frequency (VHF) band or an ultrahigh frequency (UHF) band are desirably employed to a low-frequency signal and a high-frequency signal, respectively. In the present invention, a low-frequency signal is mainly used for position detection of an object and a high-frequency signal is mainly used for information communications. In the specification, a relatively-low frequency is represented by LF, and a relatively-high frequency is represented by RF for explanation.

In the case of identifying the detailed position of an object, a transmission request is transmitted to the tag added to the object from the base station that communicates signals in the LF band through the leakage coaxial cable, and it is possible to identify a part of the leakage coaxial cable to which the object is moving closer on the basis of delay of arrival time of the ID replied from the tag. Transmission of information between the base station and the tag except the position identification is performed using radio waves in the RF band in which a large amount of information can be transmitted.

As described above, the position identification of an object and communications of a large amount of information with the object can be satisfied by the low/high frequency shared leakage antenna having the leakage coaxial cable and the communication method using both of a high-frequency and a low-frequency. In order to realize the technique at a practical level, an additional object of the present invention is to realize a unit which reduces the sensitivity of the effective sensitivity areas in a low-frequency (for example, a low frequency in the LF band) band.

In order to achieve the additional object, a conductor line configuring a closed-loop structure is provided in parallel with the elongation direction of the leakage coaxial cable sensitive to a high frequency to form integrated three conductor lines in the present invention. An inner conductor and an outer conductor of the leakage coaxial cable are terminated in resistance at terminal portions of the three conductor lines, and the inner conductor or the outer conductor and the conductor line are short-circuited.

As inputs to the three conductor lines, high-frequency electromagnetic waves are applied between the inner conductor and the outer conductor, and low-frequency electromagnetic waves are applied between the inner or outer conductor of the leakage coaxial cable and the conductor line provided in parallel. High-frequency electromagnetic waves are radiated to outer spaces in compliance with the operation principle of a normal leakage coaxial cable. The energy of high-frequency electromagnetic waves existing outside is trapped by the leakage coaxial cable due to the duality of electromagnetic waves. The energy of low-frequency electromagnetic waves exists as current flowing in the directions opposite to each other along the two parallel conductors. In compliance with the Faraday's law, high-intensity magnetic fields are generated in the direction orthogonal to the travelling direction of the two parallel lines as well as in a plane orthogonal to a plane including the two lines. This principle will be described later using FIG. 2A to FIG. 2D. Therefore, the three conductor lines of the present invention can realize an integrated antenna sensitive to high-frequency electromagnetic waves and low-frequency electromagnetic waves.

In order to reduce the inductance of the two conductors in parallel with the input of the antenna for the purpose of efficiently transmitting the energy of low-frequency electromagnetic waves to the antenna as the three conductor lines, it is effective to insert a capacitance element in parallel at an input portion of the antenna for low-frequency electromagnetic waves. If the length of the antenna is long, the inductance is increased. Thus, the provision of the capacitance element at the terminal portion of the antenna for low-frequency electromagnetic waves can prevent an increase in the dimension of the base station due to an increase in the capacitance value of the input portion of the antenna. If the capacitance at the terminal portion is realized using a resonant circuit formed of a capacitor and an inductor, a large capacitance value can be realized with a small value of a circuit element, advantageously leading to downsizing of the circuits. In order to uniformly radiate low-frequency electromagnetic waves from the antenna in a plane orthogonal to the travelling direction of the antenna, it is effective that the conductor line to be provided in parallel is covered with a magnetic material having attenuation characteristics to low-frequency electromagnetic waves.

Further, the LF/RF shared leakage coaxial cable of the present invention has the three-conductor-line structure which is essentially an open structure where no closed area is formed. Thus, a branching structure can be formed. In this case, it is important that the same electromagnetic energy is distributed to each branch of the branching structure in terms of a stable operation of the system. If it is assumed that a branch structure is coupled to a stem structure in the branching structure, it is necessary to distribute electric power corresponding to electromagnetic energy from the stem structure to the branch structure at an arbitrary ratio. The distribution ratio corresponds to the ratio of a real part of impedance expected at connection points, namely, branching points between the stem structure and the branch structure. In order to adjust the ratio to an arbitrary value, the three conductor lines of the technique forming the respective branch structures are terminated by a variable resistance, and the value of the variable resistance is adjusted, so that the real part of impedance at the branching points can be a desired value. It is not necessary to consider a phase for the LF band because the wavelength is extremely long in effect (a few kilometers to several tens of kilometers). However, it is necessary to consider phase matching, namely, reactance matching at a branching point for the RF band.

Input impedance $Z_{in}$ of the transmission line that terminates impedance $Z_L$ is obtained by the following equation (1).

$$Z_{in}=Z_c*(Z_L+jZ_c \tan \beta l)/(Z_c+jZ_L \tan \beta l) \quad (1)$$

wherein $Z_c$, $\beta$, and l represent the characteristic impedance of the transmission line, a propagation multiplier, and the length of the transmission line, respectively.

Therefore, the variable resistance and the variable reactance are coupled in parallel or in series to each other, and the variable reactance is adjusted together with the variable resistance for the RF band, so that the electromagnetic energy in the RF band can be distributed with an arbitrary value.

A low/high frequency shared leakage antenna of the present invention is configured to include a high-frequency leakage coaxial cable having an inner conductor, a conductor line formed in parallel with the high-frequency leakage coaxial cable, and a termination resistance which terminates the inner conductor of the high-frequency leakage coaxial cable and the conductor line at one end of the high-frequency leakage coaxial cable. One of the characteristics of the present invention is that a low-frequency transmitter circuit having a capacitor and a first inner resistance is coupled between the conductor line and the inner conductor at the other end of the high-frequency leakage coaxial cable, and a high-frequency transmitter circuit having a second inner resistance is coupled between the inner conductor and the conductor line at the other end of the high-frequency leakage coaxial cable.

The low/high frequency shared leakage antenna of the present invention may be configured in such a manner that the conductor line is formed in parallel with the high-frequency leakage coaxial cable, an outer conductor of the leakage coaxial cable and the conductor line are short-circuited at one end of the cable, the inner conductor of the leakage coaxial cable and the conductor line are short-circuited through the termination resistance at the one end of the cable, the low-frequency transmitter circuit having the capacitor and the first inner resistance is coupled between the conductor line and the inner conductor at the other end of the cable, and the high-frequency transmitter circuit having the second inner resistance is coupled between the inner conductor and the outer conductor at the other end of the cable.

Further, the low/high frequency shared leakage antenna of the present invention may be configured in such a manner that the conductor line is formed in parallel with the high-frequency leakage coaxial cable, the inner conductor of the leakage coaxial cable and the conductor line are short-circuited through a resonant circuit formed of a capacitor and an inductor at one end of the cable, the inner conductor and the outer conductor of the leakage coaxial cable are short-circuited through the termination resistance at the one end of the cable, the low-frequency transmitter circuit having the capacitor and the first inner resistance is coupled between the conductor line and the inner conductor at the other end of the cable, and the high-frequency transmitter circuit having the second inner resistance is coupled between the inner conductor and the outer conductor at the other end of the cable.

Further, the low/high frequency shared leakage antenna of the present invention may be configured in such a manner that the conductor line is formed in parallel with the high-frequency leakage coaxial cable, the outer conductor of the leakage coaxial cable and the conductor line are short-circuited through the resonant circuit formed of the capacitor and the inductor at one end of the cable, the inner conductor and the outer conductor of leakage coaxial cable are short-circuited through the termination resistance at the one end of the cable, the low-frequency transmitter circuit having the capacitor and the first inner resistance is coupled between the conductor line and the inner conductor at the other end of the cable, and the high-frequency transmitter circuit having the second inner resistance is coupled between the inner conductor and the outer conductor at the other end of the cable.

In the above-described configuration, it is preferable that the conductor line formed in parallel with the leakage coaxial cable is covered with a magnetic material.

On the other hand, a close-range detection system of the present invention includes a base station apparatus in which a signal is multiplexed by a high-frequency transmitter circuit and a low-frequency transmitter circuit, a low/high frequency shared leakage antenna that includes a leakage coaxial cable and is coupled to the base station apparatus, and a wireless tag having an antenna sensitive to high-frequency signals and low-frequency signals and having a high-frequency receiver circuit and a low-frequency receiver circuit.

The close-range detection system of the present invention is preferably configured in such a manner that the high-frequency transmitter circuit is replaced by a high-frequency receiver circuit, and there are provided the base station apparatus in which a signal is multiplexed by a low-frequency oscillation circuit, the low/high frequency shared leakage antenna that includes the leakage coaxial cable and is coupled to the base station apparatus, and the wireless tag having an antenna sensitive to high-frequency signals and low-frequency signals and having the high-frequency transmitter circuit and the low-frequency receiver circuit.

Further, the close-range detection system of the present invention is preferably configured in such a manner that the low-frequency transmitter circuit is replaced by a low-frequency receiver circuit, and there are provided the base station apparatus in which a signal is multiplexed by a low-frequency oscillation circuit, the low/high frequency shared leakage antenna that includes the leakage coaxial cable and is coupled to the base station apparatus, and the wireless tag having an antenna sensitive to high-frequency signals and low-frequency signals and having the high-frequency receiver circuit and the low-frequency transmitter circuit.

In the above-described configuration, it is more preferable that a transmission signal is modulated on the basis of information to be multiplexed with a signal received by the wireless device and information is transmitted to the leakage coaxial cable.

In the close-range detection system of the present invention, it is also preferable that the leakage coaxial cable is linearly laid, or the leakage coaxial cable is laid in an open loop shape. Further, it is also preferable that the leakage coaxial cable is installed above a floor surface through support poles.

Hereinafter, embodiments of the present invention will be described in detail with reference to the drawings.

First Embodiment

In the first place, a first embodiment of the present invention will be described in detail with reference to FIG. 1A to FIG. 3B.

Figure 1B:
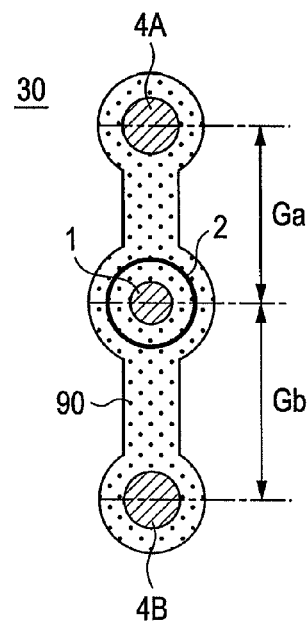
FIG. 1B is a cross-sectional view taken along the line B-B' of FIG. 1A.

FIG. 1A is a configuration diagram of a base station apparatus including a low/high frequency shared leakage antenna according to the first embodiment of the present invention. FIG. 1B is a cross-sectional view taken along the line B-B' of FIG. 1A.

The base station apparatus of the first embodiment includes a low/high frequency shared leakage antenna 30 and a base station 100. The base station 100 includes a transceiver 33. It should be noted that a configuration of the base station will be described in detail in the following embodiments. The low/high frequency shared leakage antenna 30 includes a high-frequency leakage coaxial cable having a leakage coaxial inner conductor 1 and a leakage coaxial outer conductor 2, a termination circuit 32 through which the inner conductor and the outer conductor are coupled to each other at one end of the high-frequency leakage coaxial cable, a conductor line loop structure 4 (a first conductor line 4A and a second conductor line 4B) which is arranged near the high-frequency leakage coaxial cable while being in parallel therewith to perform communications of low-frequency signals, and a matching circuit 31. The sensitivity of an effective sensitivity area in the low-frequency signal band is decreased by the loop structure 4, and electromagnetic waves in the low-frequency signal band are allowed to locally exist around the low/high frequency shared leakage antenna 30 to perform communications of signals with a frequency higher than low-frequency signals through the high-frequency leakage coaxial cable.

An insulation material such as polyethylene is arranged between the leakage coaxial inner conductor 1 and the leakage coaxial outer conductor 2. In place of the insulation material, a spacer to form an air gap may be arranged to secure insulation between the leakage coaxial inner conductor 1 and the leakage coaxial outer conductor 2. For example, braided lines formed by braiding copper wires are used for the leakage coaxial outer conductor 2. Further, on the outer circumference of the leakage coaxial outer conductor 2, there are formed slots (cut lines) 3 at intervals in accordance with frequencies to be used in the circumferential direction. As the length of each slot 3 becomes closer to $\lambda/2$, the intensity of electromagnetic waves to be radiated becomes higher. However, the actual length is much shorter than $\lambda/2$, and thus electromagnetic waves are leaked. Thereby, uniform electromagnetic waves are radiated in the elongation direction from the leakage coaxial cable.

The length of the high-frequency leakage coaxial cable is substantially the same as those of the conductor lines 4 in the elongation direction (axial direction). The leakage coaxial cable (1 and 2) and the conductor lines 4A and 4B having the closed-loop structure are integrally covered with a dielectric material 90 (see FIG. 1B).

The inner conductor 1 and the outer conductor 2 of the high-frequency leakage coaxial cable are terminated in impedance by a termination resistance 13 of the termination circuit 32 at one end of the leakage coaxial cable. In addition, the first conductor line 4A and the second conductor line 4B to which low-frequency signals are applied are short-circuited in impedance by a short-circuit path 15 of the termination circuit 32 to form the closed loop structure. Thereby, electromagnetic waves are uniformly radiated across nearly the entire length of the leakage coaxial cable.

The transceiver 33 includes low-frequency transmitter/receiver circuits and high-frequency transmitter/receiver circuits. The low-frequency transmitter/receiver circuits include, for example, a first transmitter circuit 5 and a third receiver circuit 8, and the high-frequency transmitter/receiver circuits include, for example, a second transmitter circuit 6 and a fourth receiver circuit 9. The transceiver 33 is not necessarily provided with all combinations of the low-frequency transmitter/receiver circuits and the high-frequency transmitter/receiver circuits. As will be described in the following embodiments, the configuration of the transceiver 33 included in the base station, namely, the configurations of the low-frequency communication device and the high-frequency communication device can be appropriately changed in accordance with applications of the base station.

The matching circuit 31 includes a first impedance matching circuit and a second impedance matching circuit. For example, signals in a predetermined frequency band are transmitted and received between the low-frequency transmitter/receiver circuits having the first transmitter circuit 5 and the conductor lines 4 (4A and 4B) having the closed-loop structure through the first impedance matching circuit having, for example, a capacitor 7 and a first inner resistance 11. Further, for example, signals in a high-frequency band are transmitted and received between the high-frequency transmitter/receiver circuits having the second transmitter circuit 6 and the inner conductor 1 and outer conductor 2 of the leakage coaxial cable through the second impedance matching circuit having a second inner resistance 12. The configuration of the matching circuit 31 is not limited to that described in the embodiment, and is appropriately changed in accordance with the configuration of the transceiver 33.

As shown in FIG. 1B, each of gaps Ga and Gb between the leakage coaxial cable and the conductor lines 4 (4A and 4B) is constant in the axial direction of the leakage coaxial cable. As will be described in the following embodiments, either of the leakage coaxial inner conductor 1 and the leakage coaxial outer conductor 2 can be shared with either of the conductor lines 4A and 4B to form the closed loop structure. In this case, either of Ga and Gb becomes 0 in the equation of Ga+Gb (=G).

The gap G (=Ga+Gb) is changed depending on the frequency of low-frequency signals. As an example of the configuration of the low/high frequency shared leakage antenna, a set of the leakage coaxial cable and the conductor lines 4 has a length of 20 m in the elongation direction (axial direction) and the gap G has a length of 1 cm to 50 cm. For example, 5 sets of the leakage coaxial cables and the conductor lines 4 are coupled to each other to be used as the low/high frequency shared leakage antenna having an entire length of about 100 m.

High-frequency electromagnetic waves are radiated to outer spaces in compliance with the operation principle of a normal leakage coaxial cable. The energy of high-frequency electromagnetic waves existing outside is trapped by the leakage coaxial cable due to the duality of electromagnetic waves. The energy of low-frequency electromagnetic waves exists as current flowing in the directions opposite to each other along the two parallel conductors of the closed-loop structure. In compliance with the Faraday's law, high-intensity magnetic fields are generated in the direction orthogonal to the travelling direction of the two parallel lines as well as in a plane orthogonal to a plane including the two lines.

Figure 2A:
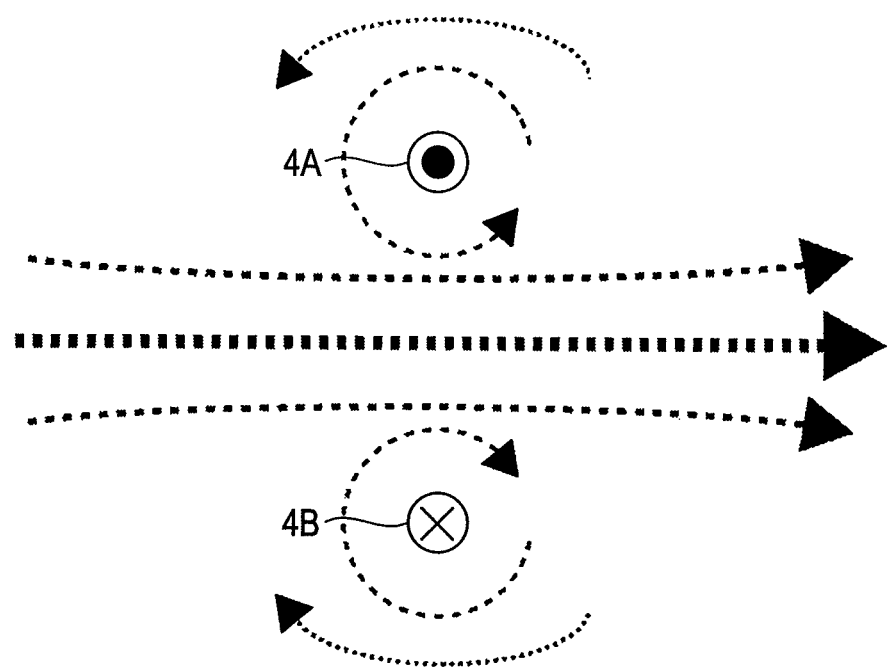
FIG. 2A is an explanation diagram of the operation principle of the low/high frequency shared leakage antenna of the present invention.

This principle will be described using FIG. 2A to FIG. 2D. In the first place, as shown in FIG. 2A, high-intensity magnetic-field components are formed, as indicated by the thick arrows, between the two parallel lines 4A and 4B in the cross sections of those two parallel lines in which current flows in the directions opposite to each other. On the other hand, magnetic-field distribution generated in outer spaces surrounding the two parallel lines 4A and 4B is reduced as indicated by the thin arrows.

Figure 2B:
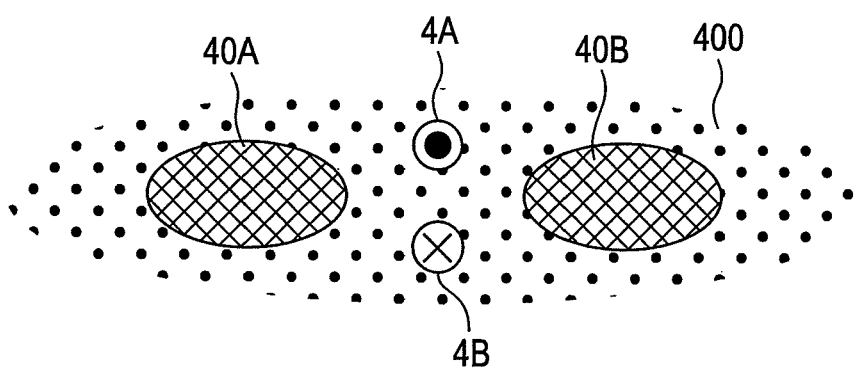
FIG. 2B is an explanation diagram of the operation principle of the low/high frequency shared leakage antenna of the present invention.
Figure 2C:
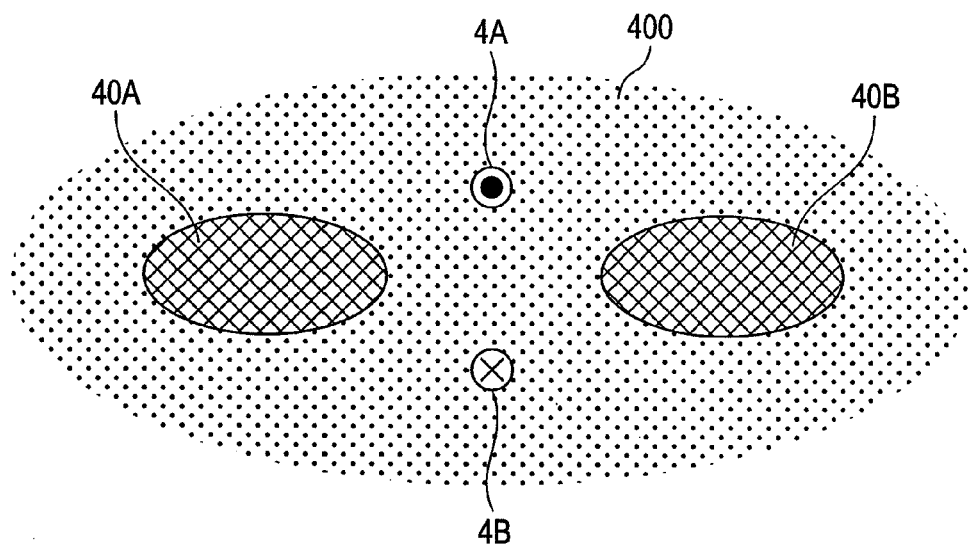
FIG. 2C is an explanation diagram of the operation principle of the low/high frequency shared leakage antenna of the present invention.
Figure 2D:
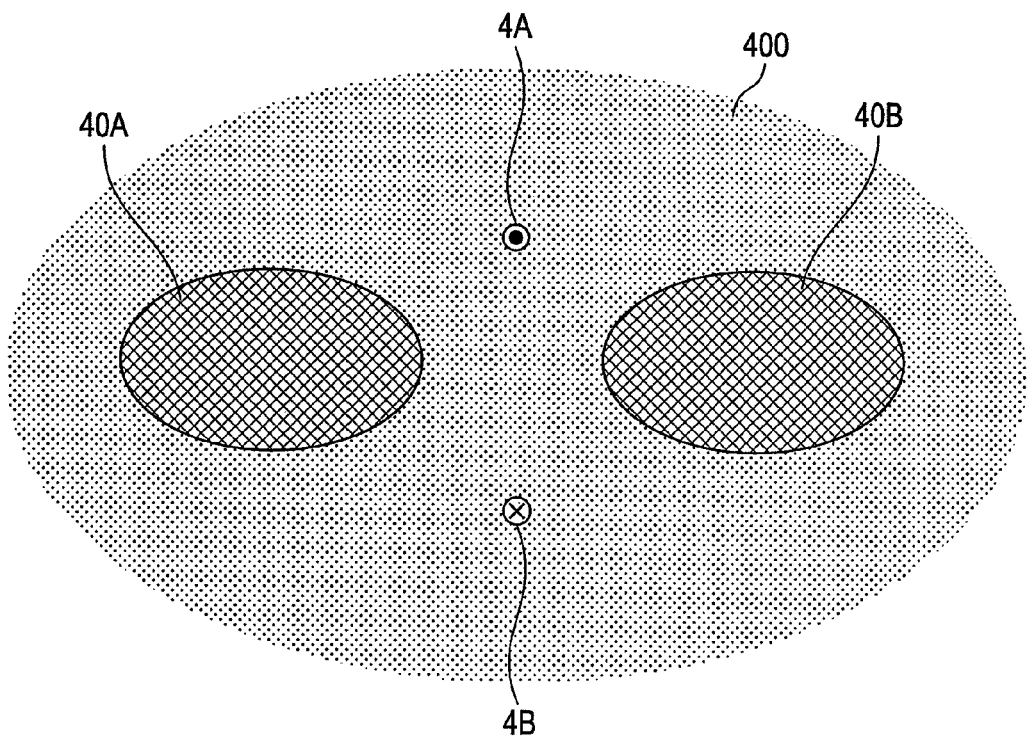
FIG. 2D is an explanation diagram of the operation principle of the low/high frequency shared leakage antenna of the present invention.

As shown in FIG. 2B to FIG. 2D, when low-frequency current flows in the two lines 4A and 4B configuring the closed-loop structure, an electromagnetic wave energy area (magnetic field area) 400 where magnetic fields of low-frequency signals exist is formed while surrounding the two lines 4A and 4B. In the electromagnetic wave energy area (magnetic field area) 400, there exist effective electromagnetic energy areas 40A and 40B where electromagnetic wave energy (magnetic field) is more uniform and stable.

As described above, low-frequency current is allowed to flow in the two lines 4A and 4B in the opposite directions, so that the sensitivity of the effective sensitivity area 400 in the low-frequency signal band is intentionally reduced, and the electromagnetic energy of electromagnetic waves in the low-frequency signal band can be allowed to locally exist only around the low/high frequency shared leakage antenna 30. At this time, the electromagnetic energy existing at adjacent areas of the low/high frequency shared leakage antenna 30 has overwhelmingly-strong induction field components. Thus, the energy neither propagates outside as radiated fields nor moves apart from adjacent areas of the leakage coaxial cable. As a result, the influence of reflected waves of radiated electromagnetic fields in the ambient environment is eliminated.

Further, as shown in FIG. 2B to FIG. 2D, as the gap G between the two parallel lines 4A and 4B of the low/high frequency shared leakage antenna 30 becomes larger, the ranges of the effective electromagnetic energy areas 40A and 40B which locally exist in the electromagnetic wave energy area 400 near the two parallel lines and in which electromagnetic energy necessary for communications between the base station and a tag can be secured become wider. The intensity of electromagnetic energy is increased in proportion to current I flowing in the two parallel lines. Therefore, the effective electromagnetic energy areas 40A and 40B where electromagnetic energy necessary for communications between the tag and the base station around which electromagnetic energy is allowed to eccentrically exist in wavelength order can be secured can be arbitrarily adjusted on the basis of the gap G between the two parallel lines and the current value I. The intensity of electromagnetic wave energy in the electromagnetic wave energy area 400 is continuously changed, and the ranges of the effective electromagnetic energy areas 40A and 40B in FIG. 2B to FIG. 2D are a conceptual example as practical areas.

Therefore, the integrated low/high frequency shared leakage antenna configured using the four conductor lines or the shared-type three conductor lines of the present invention has excellent sensitivity to high-frequency electromagnetic waves and low-frequency electromagnetic waves. As described above, low-frequency signals (magnetic fields) are mainly used for position detection of objects and high-frequency signals (radio waves) are mainly used for information communications in the present invention.

Figure 3A:
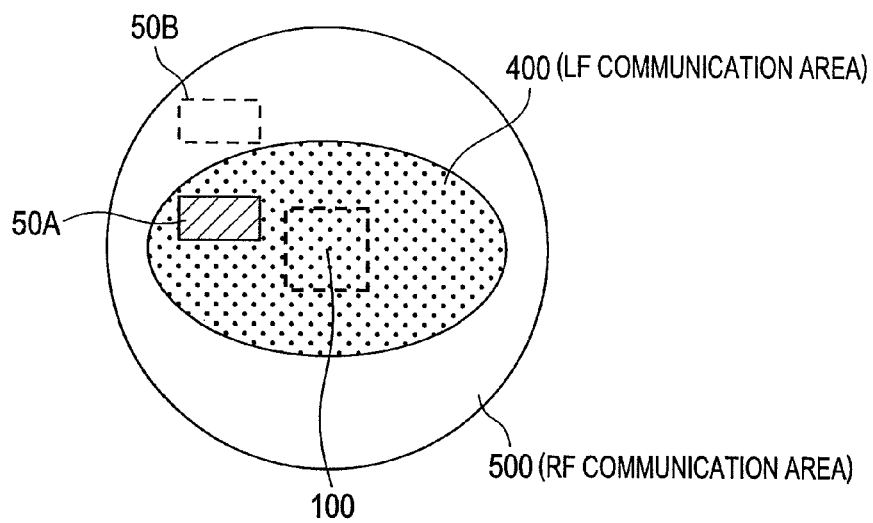
FIG. 3A is a diagram for explaining effects of the base station apparatus including the low/high frequency shared leakage antenna of the present invention.

FIG. 3A is a diagram for explaining effects of the low/high frequency shared leakage antenna of the present invention obtained by employing a method in which low-frequency current flows in the two lines configuring the closed-loop structure in the base station. By allowing low-frequency current to flow in the two lines 4A and 4B configuring the closed-loop structure, the electromagnetic wave energy area 400 where the range of which is narrower than that of a high-frequency signal communication area 500, and the more-stable effective electromagnetic energy areas 40A and 40B are formed around the base station 100. Specifically, in a system which recognizes objects and detects the positions thereof existing in a limited area using low-frequency signals and high-frequency signals, the sensitivity of the effective sensitivity areas in the low-frequency signal band is intentionally reduced, and the electromagnetic energy of electromagnetic waves in the low-frequency signal band can be allowed to locally exist only around the leakage coaxial cable of the low/high frequency shared leakage antenna. At this time, the electromagnetic energy existing at the adjacent areas of the low/high frequency shared leakage antenna has overwhelmingly-strong induction field components. Thus, the energy neither propagates outside as radiated fields nor moves apart from the adjacent areas of the leakage coaxial cable. As a result, the influence of reflected waves of radiated electromagnetic fields in the ambient environment is eliminated.

An object having a wireless tag transmits its own ID only when the object exists near the leakage coaxial cable. Thus, it can be at least specified that the position of the object is near the leakage coaxial cable. Then, the ID of the tag is transmitted using radio waves in the low-frequency signal band. Accordingly, one base station 100 can easily detect the position of an object 50A located in the effective electromagnetic energy areas 40A and 40B near the base station 100 using low-frequency signals. On the basis of the result, information communications can be performed using high-frequency signals between the base station and the object 50A. It should be noted that the position of an object 50B located outside the effective electromagnetic energy areas is not detected. As described above, the low/high frequency shared leakage antenna of the present invention has excellent sensitivity to high-frequency electromagnetic waves and low-frequency electromagnetic waves.

Figure 3B:
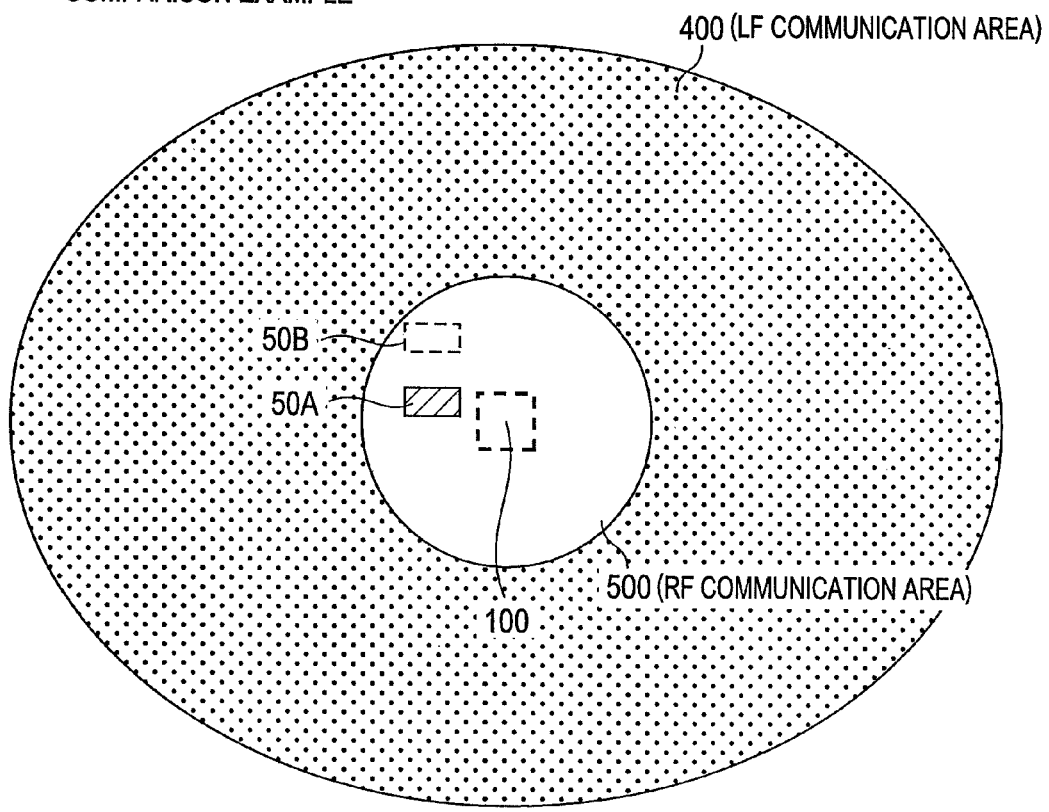
FIG. 3B is an explanation diagram of a comparison example to FIG. 3A.

FIG. 3B shows an example in which the leakage coaxial cable configuring the antenna has no closed-loop structure, as comparison and conventional examples. In the comparison example, there is no function of allowing the electromagnetic energy of electromagnetic waves in the low-frequency signal band to locally exist only around the leakage coaxial cable. Thus, the low-frequency electromagnetic wave energy area 400 is formed across a range wider than the high-frequency signal communication area 500. In this case, only one base station 100 neither accurately detect the positions of the objects 50A and 50B, nor perform effective information communications. Accordingly, it is necessary to employ the triangulation using plural expensive wireless reception stations as described above.

According to the present invention, by employing the integrated low/high frequency shared leakage antenna configured using the four conductor lines or the shared-type three conductor lines, communications using the ID assigned to the wireless tag can be realized using low-frequency and high-frequency radio waves between the wireless tag provided to the object moving closer to the antenna and the base station as shown in FIG. 3A. Accordingly, the detection of the position of the object using the wireless tag and the information communications can be realized without the triangulation, in other words, without additionally installing expensive wireless reception stations. Since excellent sensitivity to low-frequency electromagnetic waves and high-frequency electromagnetic waves can be realized by the low/high frequency shared leakage antenna of the present invention, a remote object detection system using low-frequency and high-frequency electromagnetic waves can be realized with one linear antenna in an open area.

Second Embodiment

Figure 4A:
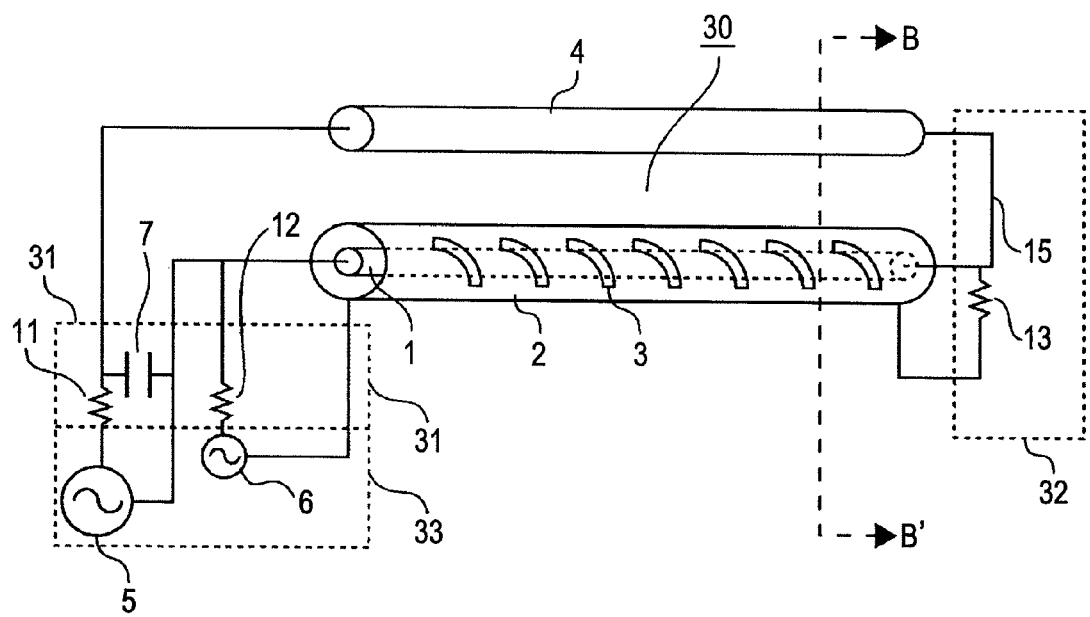
FIG. 4A is a configuration diagram of a base station apparatus including a low/high frequency shared leakage antenna with a low/high frequency leakage coaxial cable according to a second embodiment of the present invention.
Figure 4B:
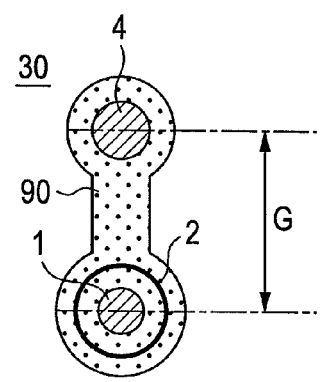
FIG. 4B is a cross-sectional view taken along the line B-B' of FIG. 4A.

Next, a second embodiment of the present invention will be described. FIG. 4A is a diagram for showing a configuration of a base station apparatus including a low/high frequency shared leakage antenna with an open-type low/high frequency leakage coaxial cable according to the second embodiment of the present invention. FIG. 4B is a cross-sectional view taken along the line B-B' of FIG. 4A.

The high-frequency leakage coaxial cable includes a leakage coaxial inner conductor 1 and a leakage coaxial outer conductor 2 on which slots 3 are formed. A gap G between the leakage coaxial cable and a conductor line 4 provided in parallel with the travelling direction is constant, namely, the leakage coaxial cable and the conductor line 4 are formed in parallel with each other. In the embodiment, the conductor line 4B of FIG. 4A is shared with the leakage coaxial inner conductor 1 to form a closed-loop structure. Specifically, the low/high frequency shared leakage antenna is configured using integrated three conductor lines.

The inner conductor 1 and the outer conductor 2 of the leakage coaxial cable are terminated in impedance by a termination resistance 13 at one end of the leakage coaxial cable to form a loop structure. Further, the conductor line 4 and the inner conductor 1 are short-circuited in impedance by a short-circuit path 15 at one end that is the terminal of the three conductor lines.

The conductor line 4 and the inner conductor 1 are coupled to a first transmitter circuit 5 that is a low-frequency transmitter/receiver circuit of a base station 100 at the other end that is an input terminal of the three conductor lines through a first impedance matching circuit of a matching circuit 31, namely, a capacitor 7 and a first inner resistance 11 in this case. Further, the inner conductor 1 and the outer conductor 2 are coupled to a second transmitter circuit 6 that is a high-frequency transmitter/receiver circuit of the base station 100 through a second impedance matching circuit, namely, a second inner resistance 12 in this case. The transmission frequency of the first transmitter circuit 5 is set lower than that of the second transmitter circuit 6. The electric power of the low-frequency first transmitter circuit 5 generates high-intensity magnetic fields with the band-like loop structure formed of the conductor line 4 and the inner conductor 1 in the direction orthogonal to the travelling direction of the three conductor lines as well as in a plane orthogonal to a plane including the conductor line 4 and the inner conductor 1.

The capacitor 7 of the first impedance matching circuit maintains excellent impedance matching between the low-frequency first transmitter circuit 5 and the band-like loop formed of the conductor line 4 and the inner conductor 1 by compensating inductance components of the conductor line 4 and the inner conductor 1, and improves the efficiency of generating magnetic fields of an effective electromagnetic energy area. The electric power of the high-frequency second transmitter circuit 6 is radiated from the slots 3 through the leakage coaxial cable formed of the inner conductor 1 and the outer conductor 2. Thus, excellent sensitivity to low-frequency and high-frequency electromagnetic waves can be realized in an open area by the antenna having the integrated three conductor line structure.

As described above, according to the embodiment, excellent sensitivity to low-frequency and high-frequency electromagnetic waves can be realized by the low/high frequency leakage coaxial antenna having the three conductor line structure with the integrated termination structure. Specifically, the embodiment can provide the base station including the integrated low/high frequency shared leakage antenna configured using the three conductor lines. If the low/high frequency shared leakage antenna of the present invention is employed, communications using the ID provided to the wireless tag can be realized using low-frequency and high-frequency radio waves between the wireless tag provided to the object moving closer to the antenna and the base station. Accordingly, the detection of the position of the object using the wireless tag and the information communications can be realized without the triangulation, in other words, without additionally installing expensive wireless reception stations. Since excellent sensitivity to low-frequency electromagnetic waves and high-frequency electromagnetic waves can be realized by the low/high frequency shared leakage antenna of the present invention, a remote object detection system using low-frequency and high-frequency electromagnetic waves can be realized with one linear antenna in an open area.

Third Embodiment

Figure 5:
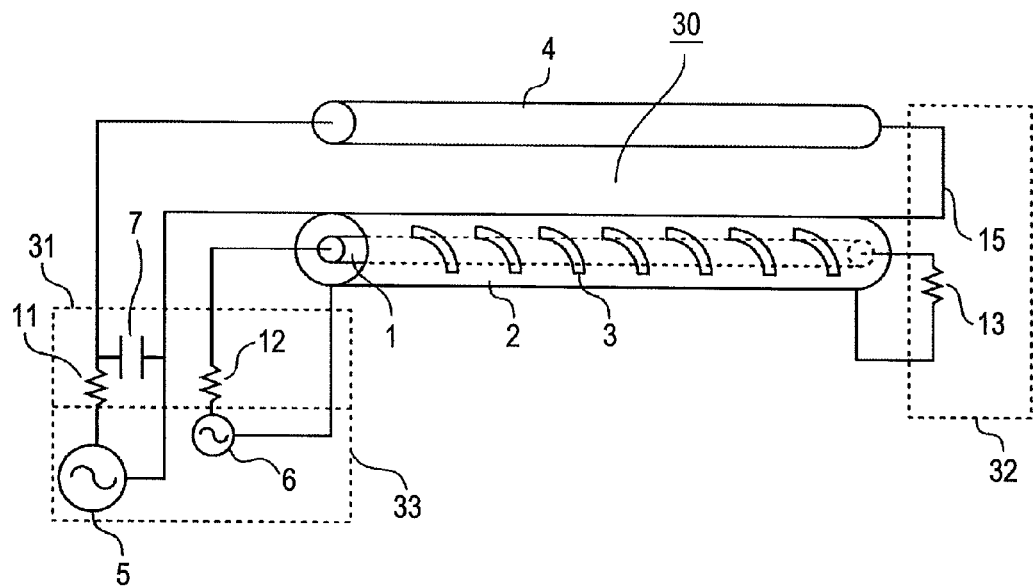
FIG. 5 is a configuration diagram of a base station apparatus including a low/high frequency leakage coaxial cable according to a third embodiment of the present invention.

FIG. 5 is a diagram for showing a configuration of a base station apparatus including an open-type low/high frequency leakage coaxial cable according to a third embodiment of the present invention. In the embodiment, one conductor line 4 is used, and the outer conductor 2 of the leakage coaxial cable in the first embodiment is shared with the other of the conductor lines to form a closed-loop structure. Specifically, the low/high frequency shared leakage antenna is configured using integrated three conductor lines. Other configurations are the same as those of the second embodiment. According to the embodiment, the total surface area of the conductor that radiates low-frequency electromagnetic waves is increased as compared to the second embodiment. Thus, resistance to current radiating low-frequency electromagnetic waves is reduced, and the efficiency of radiation of the electric power generated by the first transmitter circuit to outer spaces is improved. On the other hand, the width of the band-like loop formed of the conductor line 4 and the outer conductor 2 is narrowed as compared to the second embodiment, and thus an area where the three-conductor-structure antenna can efficiently generate magnetic fields is reduced.

Fourth Embodiment

Figure 6:
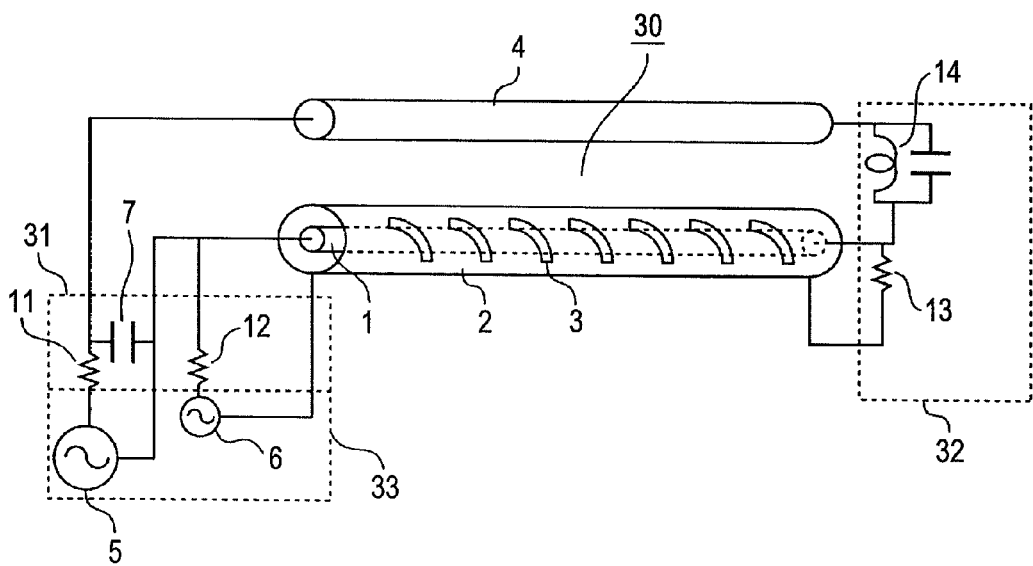
FIG. 6 is a configuration diagram of a base station apparatus including a low/high frequency leakage coaxial cable according to a fourth embodiment of the present invention.

FIG. 6 is a diagram for showing a configuration of a base station apparatus including a low/high frequency shared leakage antenna with an open-type low/high frequency leakage coaxial cable according to a fourth embodiment of the present invention. The fourth embodiment is different from the second embodiment in that the conductor line 4 and the inner conductor 1 are terminated by a resonant circuit 14 including an LC in place of the short-circuit path 15 at a terminal portion of the antenna formed of three conductor lines. According to the embodiment, a large capacitance value can be realized with a small value of a circuit element used in the resonant circuit 14 and L-components of the conductor line 4 can be offset. Thus, circuits coupled to the antenna can be advantageously downsized.

Fifth Embodiment

Figure 7:
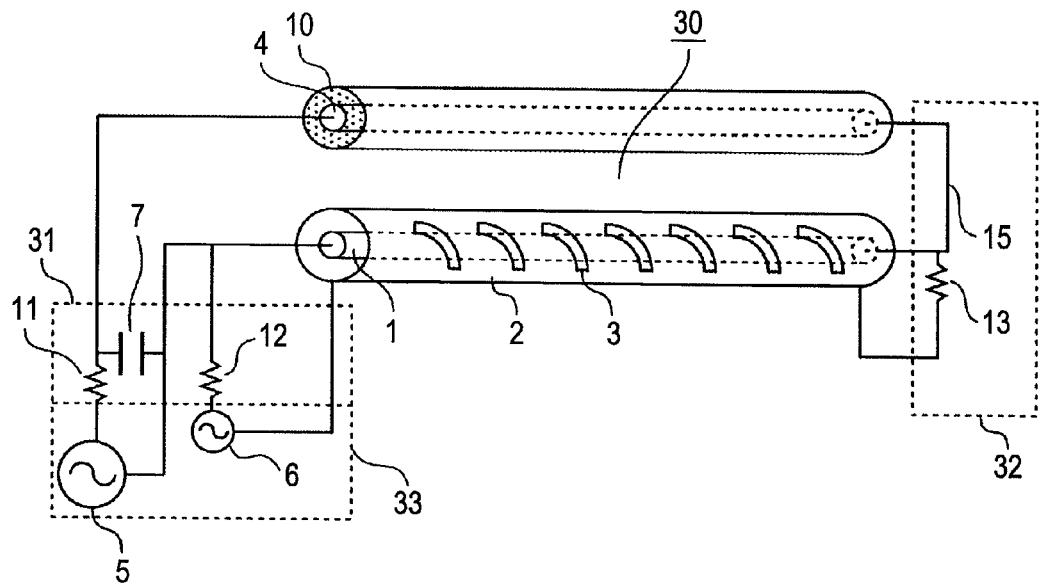
FIG. 7 is a configuration diagram of a base station apparatus including a low/high frequency leakage coaxial cable according to a fifth embodiment of the present invention.

FIG. 7 is a diagram for showing a configuration of a base station apparatus including a low/high frequency shared leakage antenna with an open-type low/high frequency leakage coaxial cable according to a fifth embodiment of the present invention. The fifth embodiment is different from the second embodiment in that the conductor line 4 is covered with a magnetic material 10. According to the embodiment, the energy of magnetic fields generated by the conductor line 4 is absorbed by the magnetic material 10, and thus the magnetic fields radiated from the inner conductor 1 are uniformly radiated in a plane orthogonal to the travelling direction of the inner conductor 1. Accordingly, a detection range for low-frequency electromagnetic waves of the low/high frequency shared leakage antenna can be advantageously enlarged.

Sixth Embodiment

Figure 8:
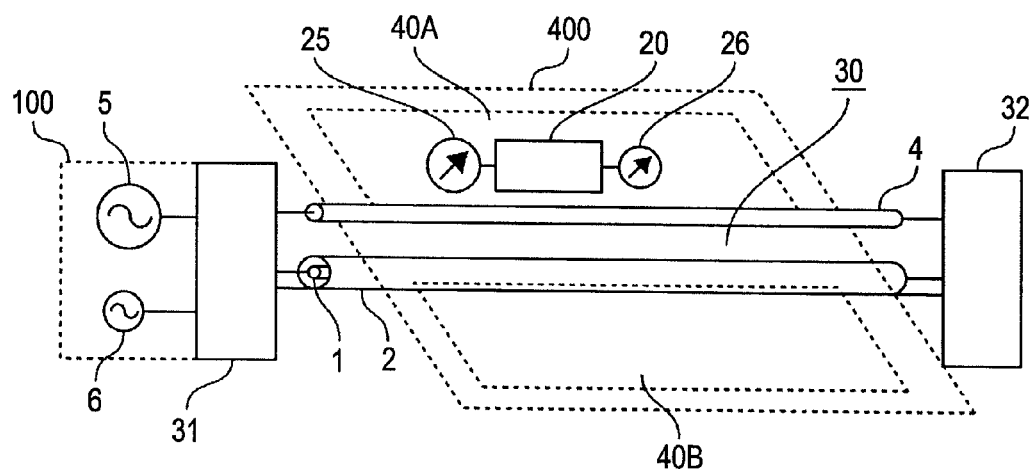
FIG. 8 is a configuration diagram of a close-range detection system using a low/high frequency leakage coaxial cable according to another embodiment of the present invention.

FIG. 8 is a diagram for showing a configuration example of a close-range detection system, according to a sixth embodiment of the present invention, using the low/high frequency shared leakage antenna with the open-type low/high frequency leakage coaxial cable of each of the above-described embodiments. In the embodiment, the three-conductor-structure antenna formed of the inner conductor 1 and the outer conductor 2 configuring the leakage coaxial cable and the conductor line 4 that is arranged in parallel with the leakage coaxial cable is linearly laid. One end of the three-conductor-structure antenna is terminated by the termination circuit 32. The other end of the three-conductor-structure antenna is coupled to the transceiver of the base station 100 of the close-range detection system, namely, the first transmitter circuit 5 that generates low-frequency electromagnetic waves and the second transmitter circuit 6 that generates high-frequency electromagnetic waves. The other end of the three-conductor-structure antenna is excited by a signal of the transceiver.

As inputs to the three conductor lines, high-frequency electromagnetic waves are applied between the inner conductor and the outer conductor from the second transmitter circuit 6, and low-frequency electromagnetic waves are applied between the inner conductor 1 or the outer conductor 2 of the leakage coaxial cable and the closed conductor line 4 arranged in parallel with the leakage coaxial cable from the first transmitter circuit 5. High-frequency electromagnetic waves are radiated to outer spaces in compliance with the operation principle of a normal leakage coaxial cable. The energy of high-frequency electromagnetic waves existing outside is trapped by the leakage coaxial cable due to the duality of electromagnetic waves. The energy of low-frequency electromagnetic waves exists as current flowing in the directions opposite to each other along the two parallel conductors configuring the closed conductor lines. In compliance with the Faraday's law, high-intensity magnetic fields are generated in the direction orthogonal to the travelling direction of the two parallel lines as well as in a plane orthogonal to a plane including the two lines.

The low-frequency magnetic fields and the high-frequency electromagnetic fields radiated from the antenna locally exist at an adjacent area 400 (especially, the effective electromagnetic energy areas 40A and 40B) of the antenna 30, and only a terminal station 20 that exists in the adjacent area 400 and includes a first receiver circuit 25 detecting low-frequency electromagnetic waves and a second receiver circuit 26 detecting high-frequency electromagnetic waves can receives signals of the first transmitter circuit 5 and the second transmitter circuit 6. An object having the terminal station (wireless tag) 20 is able to recognize its own existing position with the detected signals of the first transmitter circuit 5 and the second transmitter circuit 6.

According to the embodiment, it is possible to provide the base station including the integrated low/high frequency shared leakage antenna configured using the three conductor lines. By employing the low/high frequency shared leakage antenna of the present invention, communications using the ID assigned to the wireless tag can be realized using low-frequency and high-frequency radio waves between the wireless tag provided to the object moving closer to the antenna and the base station. Accordingly, the detection of the position of the object using the wireless tag and the information communications can be realized without the triangulation, in other words, without additionally installing expensive wireless reception stations. Since excellent sensitivity to low-frequency electromagnetic waves and high-frequency electromagnetic waves can be realized by the low/high frequency shared leakage antenna of the present invention, a remote object detection system using low-frequency and high-frequency electromagnetic waves can be realized with one linear antenna in an open area.

Seventh Embodiment

Figure 9:
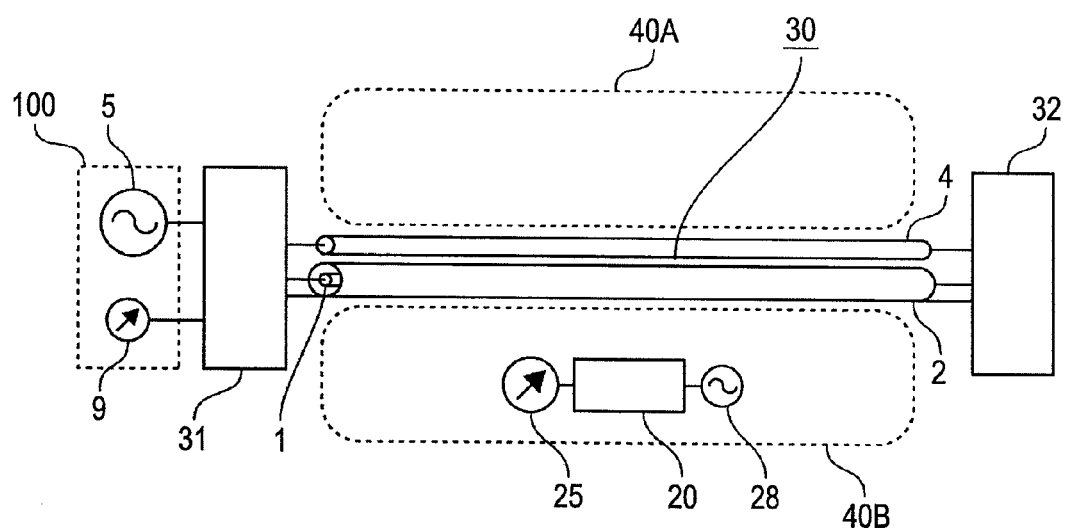
FIG. 9 is a configuration diagram of a close-range detection system using a low/high frequency leakage coaxial cable according to another embodiment of the present invention.

FIG. 9 is a diagram for showing another configuration example of a close-range detection system, according to a seventh embodiment of the present invention, using the low/high frequency shared leakage antenna with the open-type low/high frequency leakage coaxial cable of each of the above-described embodiments. The seventh embodiment is different from the embodiment of FIG. 8 in that the second transmitter circuit 6 of the base station 100 that generates high-frequency electromagnetic waves is replaced by the fourth receiver circuit 9 that detects the high-frequency electromagnetic waves, and the second receiver circuit 26 of the terminal station 20 that detects high-frequency electromagnetic waves is replaced by a fourth transmitter circuit 28 that generates the high-frequency electromagnetic waves.

According to the embodiment, the terminal station can transmit high-frequency signals to the base station using information of low-frequency electromagnetic waves generated by the base station. Thus, it is possible to realize a system in which a command can be issued to the terminal station located far using a low frequency with less electric power, the terminal station transmits a large amount of information to the base station with high electric power in response to the command. In the case where information is transmitted less frequently, the power consumption of the high-frequency circuit can be suppressed in this system while information is not transmitted. As a result, the entire power consumption of the terminal station can be reduced. In addition, a long-life operation of the terminal station can be realized and the reliability of the entire system can be advantageously improved.

Eighth Embodiment

Figure 10:
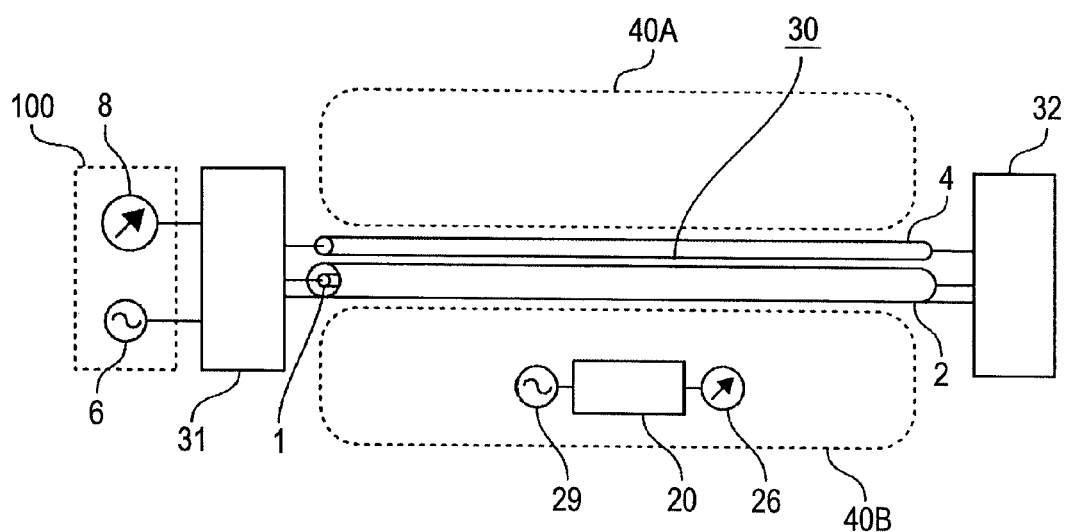
FIG. 10 is a configuration diagram of a close-range detection system using a low/high frequency leakage coaxial cable according to another embodiment of the present invention.

FIG. 10 is a diagram for showing a configuration example of a close-range detection system, according to an eighth embodiment of the present invention, using the low/high frequency shared leakage antenna with the open-type low/high frequency leakage coaxial cable of each of the above-described embodiments. The eighth embodiment is different from the embodiment of FIG. 8 in that the first transmitter circuit 5 of the base station that generates low-frequency electromagnetic waves is replaced by the third receiver circuit 8 that detects the low-frequency electromagnetic waves, and the second receiver circuit 25 of the terminal station 20 that detects low-frequency electromagnetic waves is replaced by a third transmitter circuit 29 that generates the low-frequency electromagnetic waves.

According to the embodiment, the base station 100 can transmit high-frequency signals to the terminal station 20 using information of low-frequency electromagnetic waves generated by the terminal station 20. Accordingly, it is possible to realize a system in which the terminal station 20 issues a command to the base station 100 located far using a low frequency with less electric power, and the base station transmits a large amount of information to the terminal station with high electric power in response to the command. In a service in which a base station recognizes the number of terminal stations for services and the number of terminal stations is reflected on broadcasting contents to be distributed in a system having a broadcasting form in which the base station transmits a large amount of information to the terminal stations, a unit of informing the base station of the location of each terminal station can be realized by a low-frequency circuit. Thus, the power consumption of the transmitter circuit of the terminal station can be reduced, and a long-life operation of the terminal station can be realized. As a result, the reliability of the entire system can be advantageously improved.

Ninth Embodiment

Figure 11:
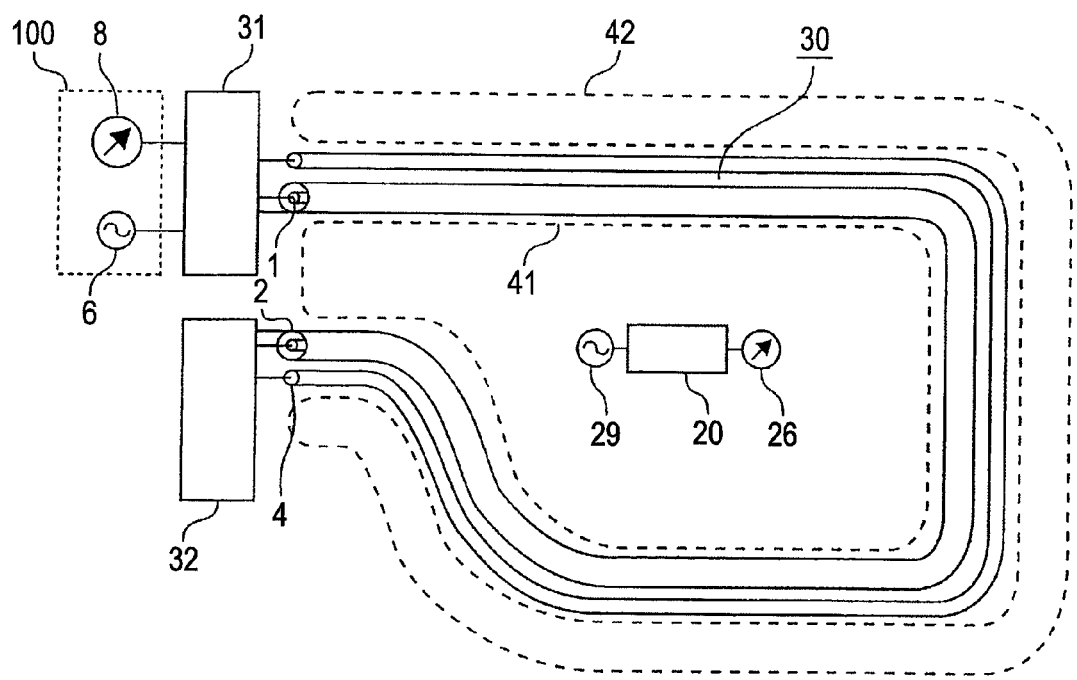
FIG. 11 is a configuration diagram of a close-range detection system using a low/high frequency leakage coaxial cable according to another embodiment of the present invention.

FIG. 11 is a diagram for showing a another configuration of a close-range detection system using a low/high frequency shared leakage antenna with an open-type low/high frequency leakage coaxial cable according to a ninth embodiment of the present invention. The ninth embodiment is different from the embodiment of FIG. 10 in that the three-conductor-structure antenna configured using the leakage coaxial cable formed of the inner conductor 1 and the outer conductor 2 and the conductor line 4 is arranged in an open-loop shape. In this example, too, the conductor line 4 is provided in parallel with the leakage coaxial cable. Specifically, the leakage coaxial cable and the conductor line 4 are in parallel with each other in terms of differential geometry.

According to the embodiment, areas where low-frequency electromagnetic waves and high-frequency electromagnetic waves can be efficiently transmitted and received by the antenna correspond to an inner area 41 of the closed-loop structure and a band-like outer area 42 along the closed-loop structure. Thus, movement of the terminal station 20 out of the inner area 41 where the terminal station 20 to be detected is kept can be effectively detected using the operation of the embodiment of FIG. 9. According to the embodiment, detection areas as effective closed areas can be realized using a group of apparatuses in physically open areas. In addition, the group of apparatuses can be easily installed, and the maintenance of the group of apparatuses can be realized by entering the inside of the closed areas without disassembling the group of apparatuses. Accordingly, the object detection system for closed areas can be more easily installed and maintenance without disassembling can be realized. As a result, the reliability of the system is advantageously improved.

Tenth Embodiment

Figure 12:
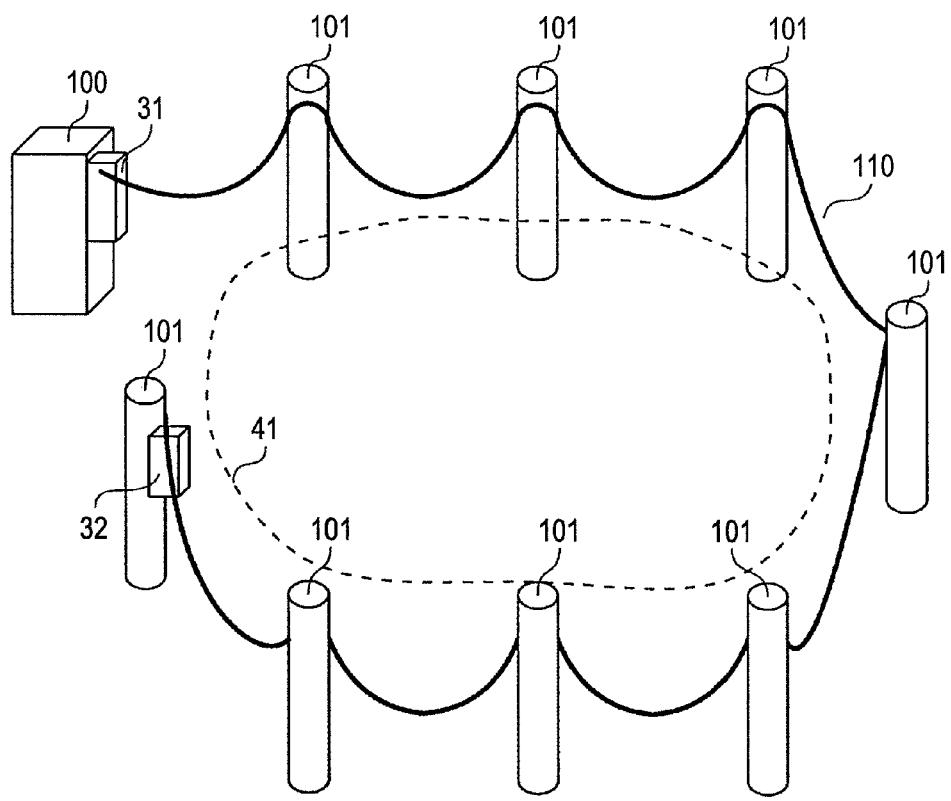
FIG. 12 is a laying diagram of a close-range detection system using a low/high frequency leakage coaxial cable according to another embodiment of the present invention.

FIG. 12 is a diagram for showing an embodiment of laying the base station apparatus of the close-range detection system using the low/high frequency shared leakage antennas with the open-type low/high frequency leakage coaxial cables of the present invention. The three-conductor-structure antennas 110 each of which is coupled to the base station 100 and is configured using the leakage coaxial cable formed of the inner conductor 1 and the outer conductor 2 and the conductor line 4 are three-dimensionally laid by plural support poles 101 surrounding the inner area 41 where detection targets exist. According to the embodiment, the close-range detection system can be realized so as to form the inner area in an arbitrary shape. In addition, the close-range detection system can be realized by a simple laying operation in which the support poles are set up and the three-conductor-structure antennas are hung from the support poles. Accordingly, the close-range detection system can be more easily laid and maintained. In addition, the installation cost of the system can be advantageously reduced.

Eleventh Embodiment

Figure 13:
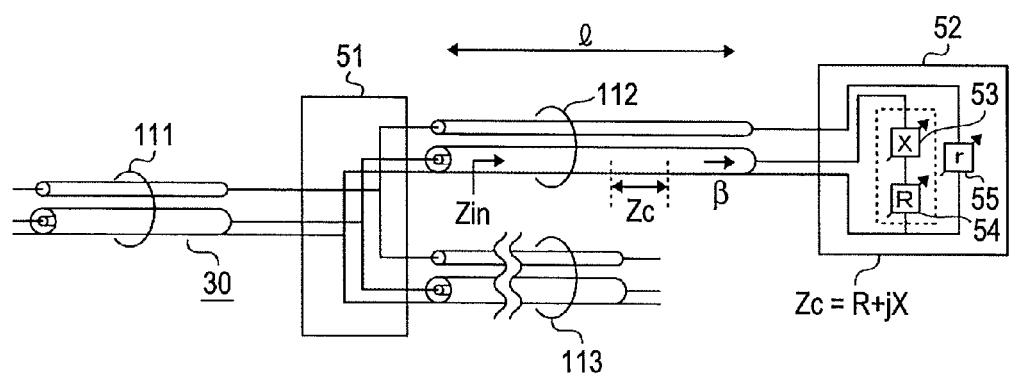
FIG. 13 is a configuration diagram of a close-range detection system using a low/high frequency leakage coaxial cable according to another embodiment of the present invention.

FIG. 13 is a diagram for showing a close-range detection system using low/high frequency shared leakage antennas according to another embodiment of the present invention. The embodiment is characterized in that the three-conductor structure antennas have a branching structure. A first three-conductor-structure antenna 111, a second three-conductor-structure antenna 112, and a third three-conductor-structure antenna 113 are coupled to each other in such a manner that the three conductors of each antenna are coupled to the corresponding conductors through a branching filter 51. In the embodiment, the first and third three-conductor-structure antennas 111 and 113 realize a stem structure, and the second three-conductor-structure antenna 112 realizes a branch structure. In the second three-conductor-structure antenna 112, the leakage coaxial outer conductor and the conductor line through which radio waves in the LF band are transmitted are terminated by a second variable resistance 55, and the leakage coaxial inner cable through which RF waves are transferred is terminated by a distribution adjustment terminal 52 having a function of terminating with a series circuit of a first variable resistance 54 and a variable reactance 53.

The first variable resistance 54, the second variable resistance 55, and the variable reactance 53 realize excellent impedance matching and a desired ratio of power distribution in the LF and RF bands of the stem structure and the branch structure in the branching filter 51. It is not necessary to consider a phase for the LF band because the wavelength is extremely long in effect (a few kilometers to several tens of kilometers). However, it is necessary to consider phase matching, namely, reactance matching at a branching point for the RF band.

Input impedance $Z_{in}$ of the transmission line that terminates impedance $Z_L$ is obtained by the following equation (2).

$$Z_{in} = Z_c * (Z_L + jZ_c \tan \beta l)/(Z_c + jZ_L \tan \beta l) \quad (2)$$

wherein "$Z_c$", "$\beta$", and "l" represent the characteristic impedance of the transmission line, a propagation multiplier, and the length of the transmission line, respectively.

Therefore, the variable resistance R and the variable reactance X are coupled in parallel or in series to each other, and the variable reactance X is adjusted together with the variable resistance R for the RF band, so that the electromagnetic energy in the RF band can be distributed with an arbitrary value. As described above, desired electromagnetic energy can be distributed from the three-conductor-structure antennas having the stem structure to the three-conductor-structure antenna having the branch structure.

Twelfth Embodiment

Figure 14:
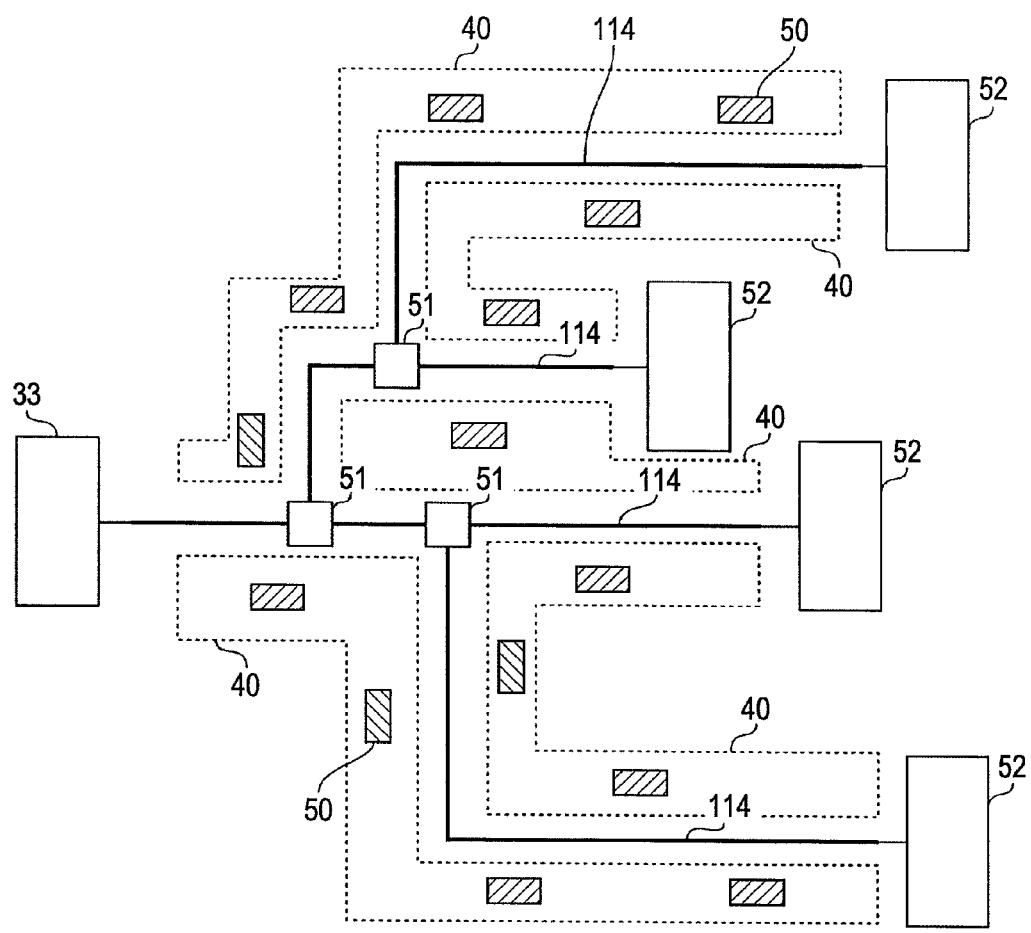
FIG. 14 is a configuration diagram of a close-range detection system using a low/high frequency leakage coaxial cable according to another embodiment of the present invention.

FIG. 14 is a diagram for showing a close-range detection system using low/high frequency shared leakage antennas according to another embodiment of the present invention. A system configuration using the three-conductor-structure antennas having the branching structure is shown in the embodiment. Three-conductor-structure antennas 114 having the branch structure including the branching filters 51 at branching points are coupled to the LF/RF transceiver 33, each branch structure of the three-conductor-structure antennas 114 having the branch structure is terminated by a distribution adjustment terminal 52. Adjacent areas 40 where the wireless tags 50 can communicate with the LF/RF transceiver 33 as the base station using radio waves in the LF band and the RF band are arranged in a branch shape along the three-conductor-structure antennas 114 having the branch structure. According to the embodiment, the areas where the wireless tags added to objects and the base station can wirelessly communicate in the LF band and the RF band are expanded in a plane. Thus, service areas of the close-range detection system can be advantageously expanded, and the close-range detection system can be more easily and advantageously laid.

Thirteenth Embodiment

FIG. 15 to FIG. 21 are diagrams each showing a close-range detection system using low/high frequency shared leakage antennas according to another embodiment of the present invention. A system configuration of the three-conductor-structure antennas having the branching structure is shown in the embodiment.

Figure 15:
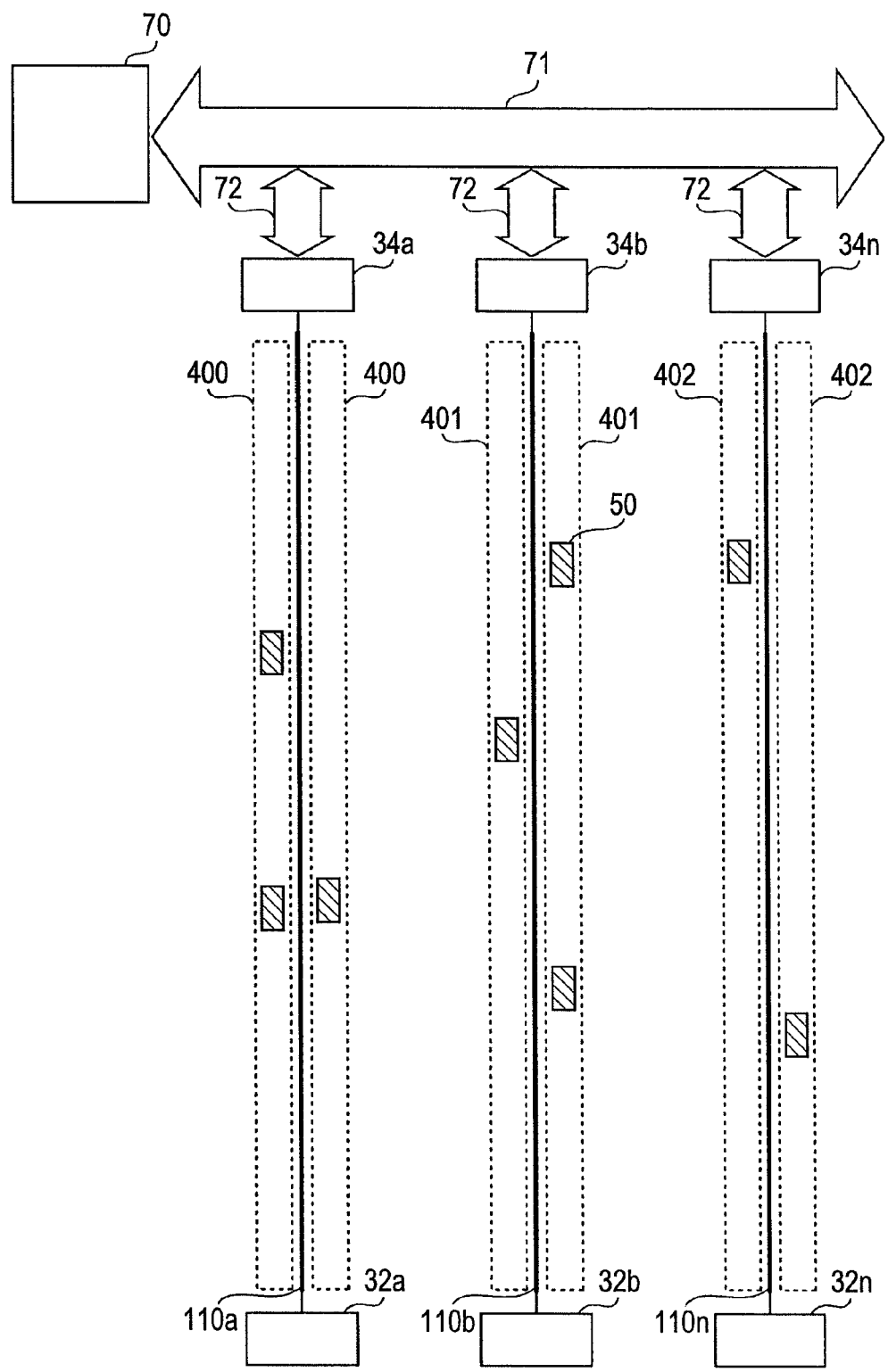
FIG. 15 is a configuration diagram of a close-range detection system using a low/high frequency leakage coaxial cable according to another embodiment of the present invention.

In FIG. 15, three sets (110a to 110n) of three-conductor-structure antennas terminated by termination circuits 32 (32a to 32n) are arranged in parallel to be coupled to LF/RF transceivers 34 (34a to 34n) with base station IDs. A central control apparatus 70 or the respective transceivers 34 control the current value I of low-frequency signals supplied to the two lines having the predetermined gap G and configuring the loop structure of the three-conductor-structure antenna 110. Accordingly, the central control apparatus 70 or the respective transceivers 34 function to appropriately adjust adjacent areas 400, 401, and 402 where the electromagnetic energy necessary for communications using low-frequency signals between the respective transceivers 34 and the wireless tags 50 can be secured.

Three LF/RF transceivers 34 with base station IDs transmit information of the wireless tags in the adjacent areas 400, 401, and 402 where the wireless tags 50 and the LF/RF transceivers 34 with base station IDs can communicate with each other using radio waves in the LF band and the RF band to a core bus 71 coupled to the central control apparatus 70 having a computer and a program through local bus 72 while adding unique base station IDs to the information.

In the system, there exist plural base stations 34 (34a to 34n) which communicate high-frequency signals and low-frequency signals with the wireless tags 50 having unique IDs through the low/high frequency shared leakage antennas 110, and each of the plural base stations has a unique ID. Each of the base stations 34 transmits a reception signal from the wireless tag 50 having the unique ID to the single central control apparatus 70 together with the unique ID of the wireless tag 50 through the core (single data) bus 71 while adding the unique self-ID of the base station 34. It should be noted that when the central control apparatus 70 transmits a wireless-tag-unique-ID transmission command to the wireless tag 50 using low-frequency signals, a unique ID signal of the wireless tag 50 is multiplexed. The wireless tag 50 returns the unique self-ID thereof using low-frequency signals only when the ID signal multiplexed with the received unique ID transmission command matches the unique self-ID of the wireless tag 50. If assuming a production line in a plant as an example, the respective transceivers 34 are arranged at intervals of 2 to 3 m, and the entire length of the three-conductor-structure antennas 110 is 100 m.

The central control apparatus 70 can simultaneously specify the adjacent area 40 identified by the base station ID and the object identified by the unique ID of the wireless tag, and the position of the object moving closer to the three-conductor-structure antenna 110 can be detected. Further, each of the LF/RF transceivers 34 with base station IDs is provided with a function of measuring a reply delay time from the wireless tag, and the reply time is transmitted to the central control apparatus, so that the central control apparatus 70 can detect the detailed position of the object located closer to the three-conductor-structure antenna.

Figure 16:
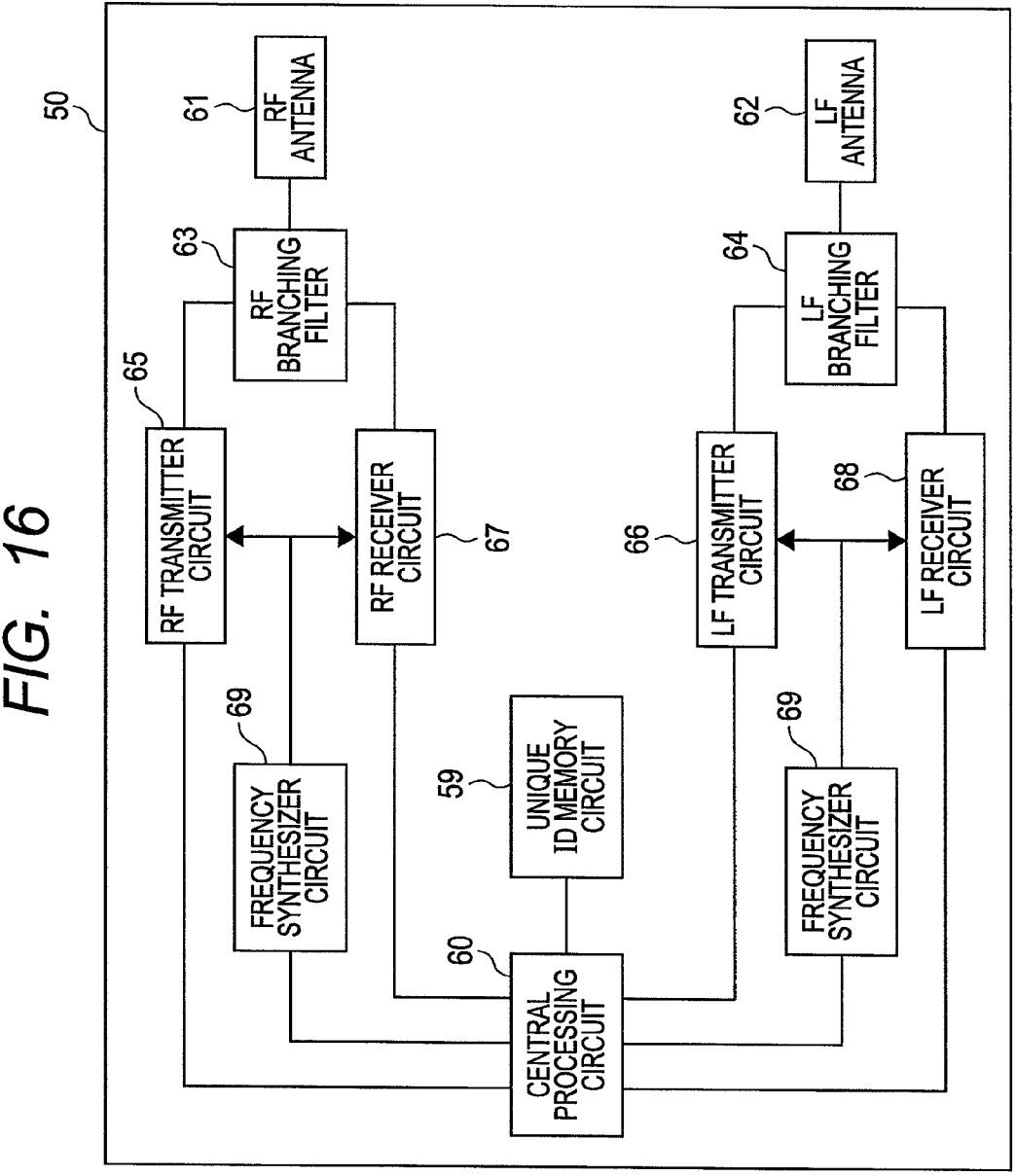
FIG. 16 is a diagram for showing a configuration example of a tag in the embodiment of FIG. 15.

FIG. 16 is a diagram for showing an embodiment of the wireless tag 50 used for the close-range detection system of the present invention. Here, a hardware configuration of the wireless tag 50 adapted for the transmitter/receiver circuits of the terminal station 20 and the base station 100 shown in FIG. 8 to FIG. 11 is shown.

The wireless tag 50 includes a pair of frequency synthesizer circuits 69, an RF transmitter circuit 65, an RF receiver circuit 67, an RF branching filter 63, an RF antenna 61, an LF transmitter circuit 66, an LF receiver circuit 68, an LF branching filter 64, an LF antenna 62, and a unique ID memory circuit 59, all of which are controlled by a central processing apparatus 60. It should be noted that an electric power circuit is omitted.

An LF transmission signal of the wireless tag 50 is generated by the LF transmitter circuit 66 using the frequency synthesizer circuit 69 as an oscillator while being multiplexed with the unique ID of the tag stored in the unique ID memory circuit 59, and is radiated to the air from the LF antenna 62 through the LF branching filter 64. An LF reception signal is taken in from the air by the LF antenna 62 of the wireless tag 50, and is demodulated by the LF receiver circuit 68 using the frequency synthesizer circuit 69 as a local oscillator through the LF branching filter 64 to be supplied to the central processing circuit 60. As similar to the above, the RF transmission signal is generated by the RF transmitter circuit 65 using the frequency synthesizer circuit 69 as an oscillator, and is radiated to the air from the RF antenna 61 through the RF branching filter 63. An RF reception signal is taken in from the air by the RF antenna 61, and is demodulated by the RF receiver circuit 67 using the frequency synthesizer circuit 69 as a local oscillator through the RF branching filter 63 to be supplied to the central processing circuit 60.

An active tag transmits the RF signal far using radiated electromagnetic fields. Thus, for example, monopole antenna sensitive to radio waves is preferably used for the RF antenna 61. On the other hand, it is necessary for the LF antenna 62 to increase the sensitivity to magnetic fields, and thus a coil antenna or a loop antenna is preferable. The wireless tag of the embodiment can hold the unique ID by using the unique ID memory circuit 59. Thus, the wireless tag can distinguish a signal transmitted by the wireless tag itself from that transmitted from another. On the contrary, the wireless tag can identify whether or not a signal received by the wireless tag itself is a signal transmitted to the wireless tag itself. By employing the circuit configuration of the embodiment, the wireless tag can transmit and receive both of RF and LF signals, and can be applied to the close-range detection system using the low/high frequency shared leakage antenna of the present invention.

Figure 17A:
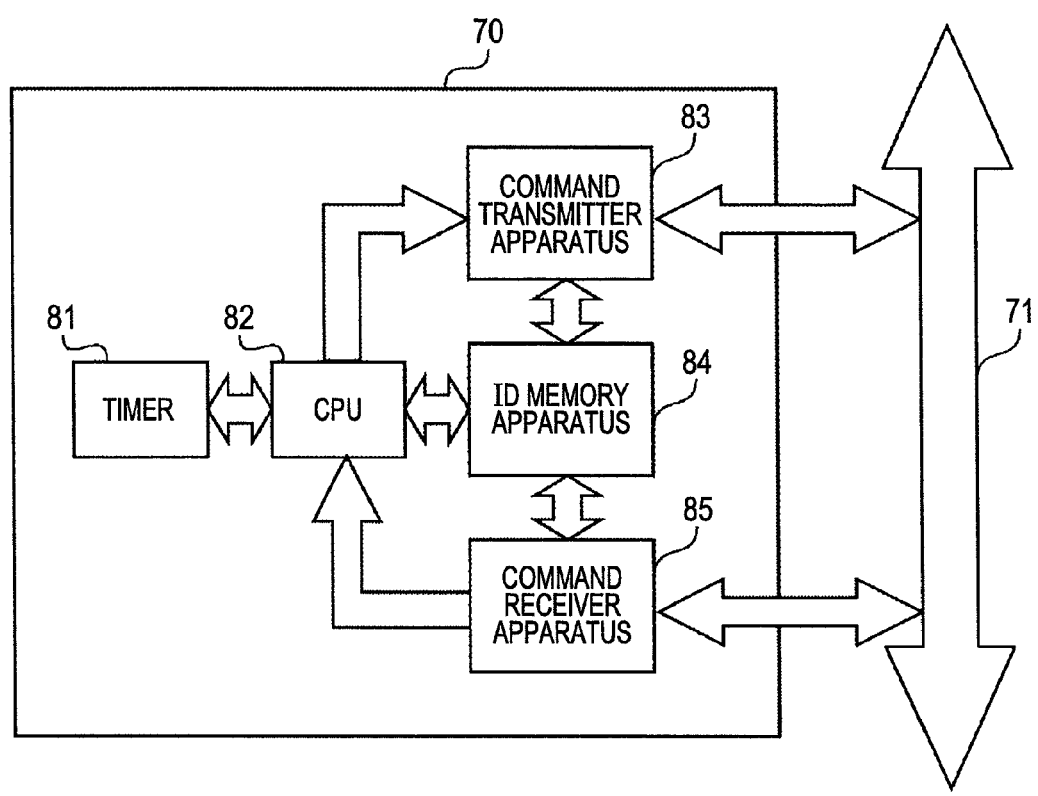
FIG. 17A is a configuration diagram of a central control apparatus in the embodiment of FIG. 15.

Next, FIG. 17A is a diagram for showing an embodiment of the central control apparatus 70 of the close-range detection system. The central control apparatus 70 of the embodiment includes a timer 81, a CPU 82, a command transmitter apparatus 83, an ID memory apparatus 84, and a command receiver apparatus 85. Information of the wireless tags in the adjacent areas 40 where the wireless tags 50 and the LF/RF transceivers 34 with base station IDs can communicate with each other using radio waves in the LF band and the RF band is transmitted to the core bus 71 coupled to the central control apparatus 70 while adding the unique base station IDs. The CPU 82 controls the command transmitter apparatus 83 and the command receiver apparatus 85 using the timer 81, stores information of the unique IDs of the wireless tags 50 and the unique IDs of the base stations in the ID memory apparatus 84, and calculates a command reply delay time corresponding to each ID to estimate the detailed positions of the wireless tags 50.

Figure 17B:
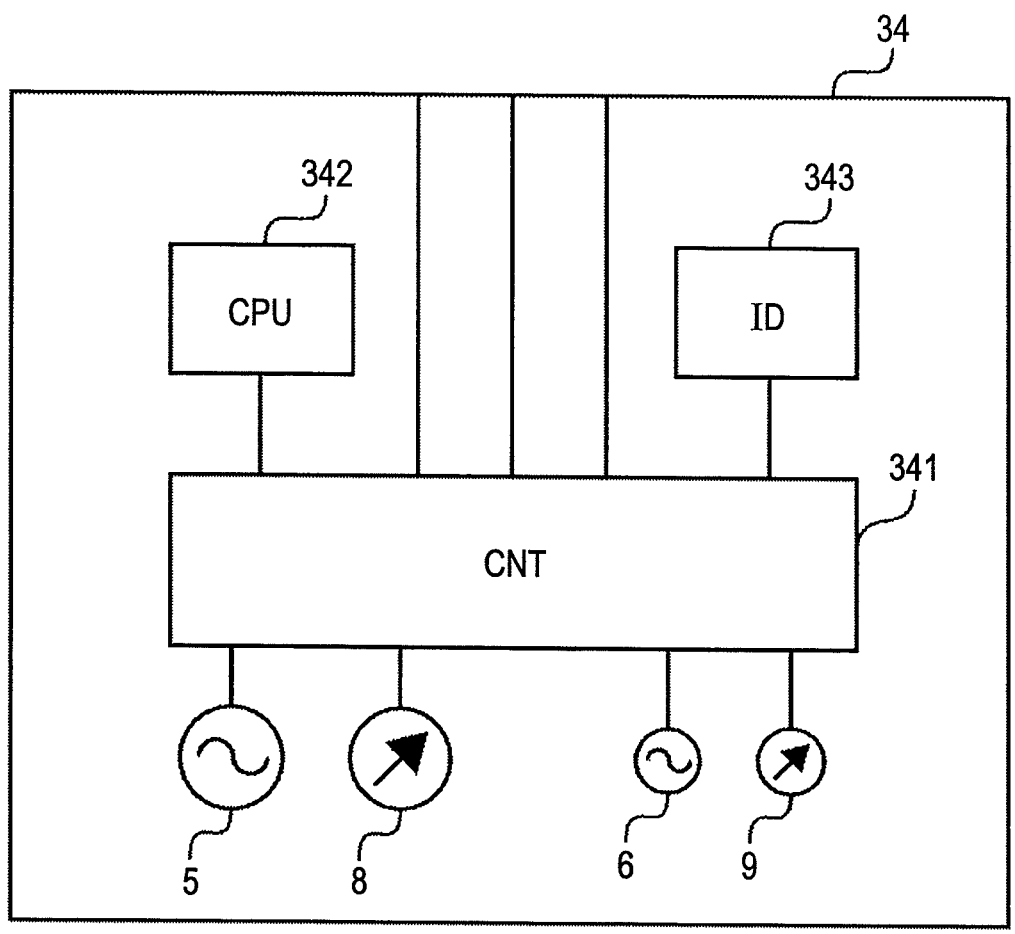
FIG. 17B is a diagram for showing a configuration example of an LF/RF transceiver with ID in the embodiment of FIG. 15.

FIG. 17B is a diagram for showing a configuration example of the base station, namely, the LF/RF transceiver 34 with ID. The LF/RF transceiver 34 with ID includes a controller (CNT) 341 coupled to the respective LF/RF transceivers (5, 6, 8, and 9), a CPU 342, and a memory apparatus 343 that holds the self-ID of the transceiver 34. An operation of the LF/RF transceiver 34 with ID will be described using a time chart of FIG. 21. It should be noted that the base station 100 in each embodiment such as the first embodiment or the sixth embodiment is configured in the same manner as the LF/RF transceiver 34 with ID, except that the memory apparatus 343 that holds the ID is not provided. The LF/RF transceiver 34 with ID may be employed as the base station 100 in each embodiment.

Figures 18, 19:
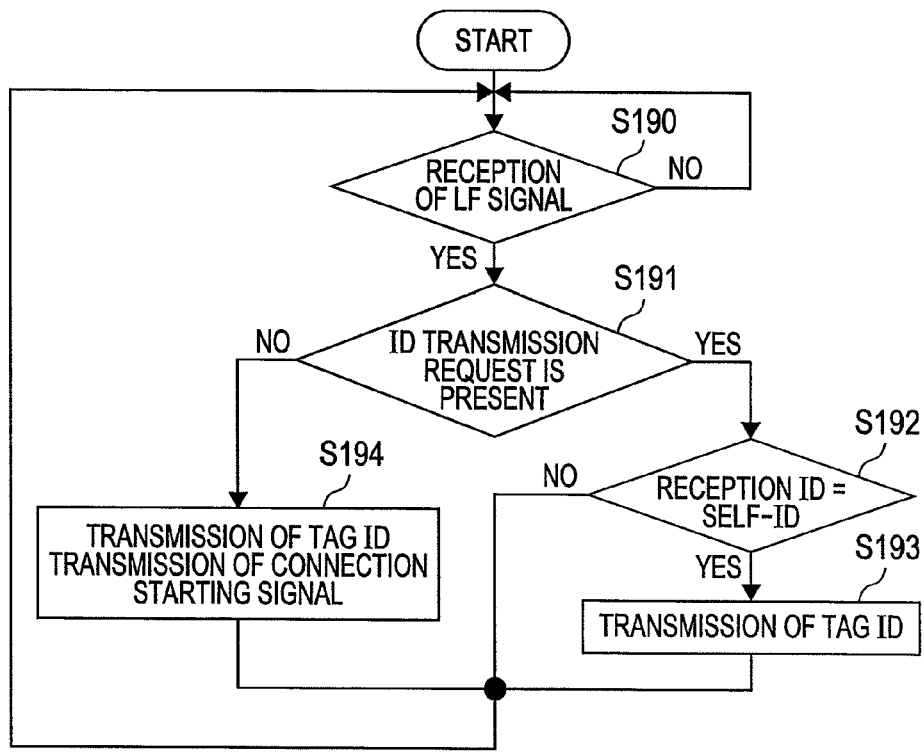
FIG. 18 is an example of a data structure of an ID memory apparatus of the central control apparatus in the embodiment of FIG. 15.
FIG. 19 is a flowchart of processes by the wireless tag in the embodiment of FIG. 15.

FIG. 18 shows an example of a format of the ID memory apparatus 84. In the ID memory apparatus 84, addresses, unique IDs of the respective wireless tags 50, unique IDs of the base stations (LF/RF transceivers 34 with IDs), statuses of a measurement flag, and reply delay time are recorded.

FIG. 19 is a flowchart for showing an operation of the wireless tag 50. The wireless tag 50 periodically outputs LF radio waves at a predetermined frequency after starting. Further, when the wireless tag 50 moves closer to the low/high frequency shared leakage antenna 30, the wireless tag 50 receives LF radio waves (S190). It is confirmed whether or not a tag ID transmission request from the central control apparatus 70 is contained in a signal obtained by demodulating the received radio waves (S191). Since a tag ID is contained in the tag ID transmission request from the central control apparatus 70, the tag 50 compares the ID with the unique self-ID (S192). Only when both match each other, the tag 50 transmits the unique self-ID using LF radio waves (S193). In the case where the tag ID transmission request from the central control apparatus 70 is not contained in the received LF radio waves, the tag 50 transmits the unique self-ID together with a connection starting signal using LF radio waves because the central control apparatus 70 recognizes the tag for the first time (S194).

Figure 20:
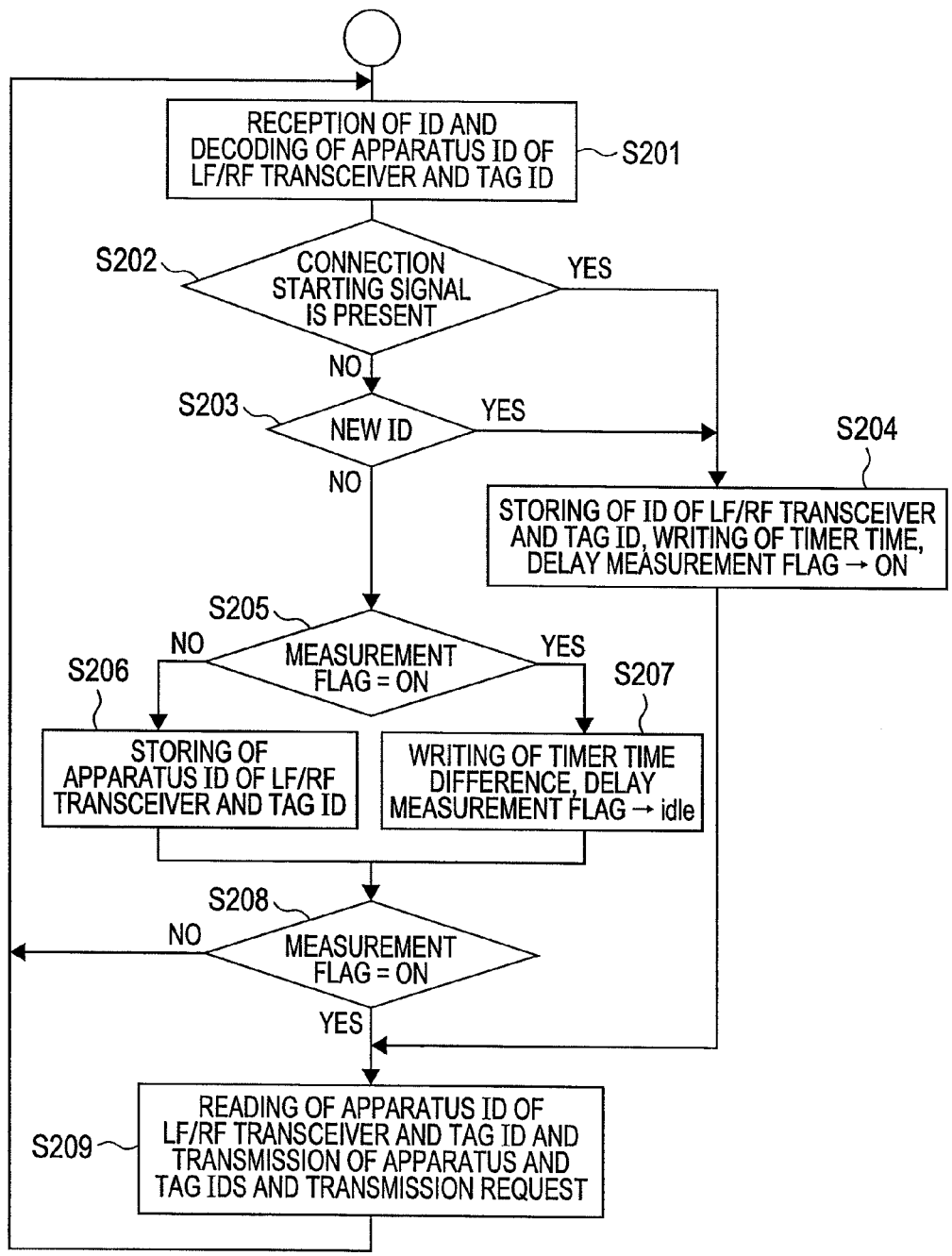
FIG. 20 is a flowchart of processes by the central control apparatus in the embodiment of FIG. 15.

An operation of the central control apparatus 70 in the embodiment is shown in a flowchart of FIG. 20.

The central control apparatus 70 has two functions: (1) detection of the tag 50 located in the effective electromagnetic energy areas 40A and 40B; and (2) obtaining detailed position information of the detected tag 50. The central control apparatus 70 initially receives and decodes the transmission signal, from the tag 50, to which the unique ID of the base station 34 and the unique ID of the tag are added in order to detect the tag 50 located in the effective electromagnetic energy areas 40A and 40B (S201). If the connection starting signal of the tag shown in the flow of FIG. 19 is contained in the reception signal (S202), the tag is recognized as one that is newly detected by the close-range detection system using the low/high frequency shared leakage antenna 30 of the present invention, and the base station unique ID and the tag unique ID are written into the ID memory apparatus 84 (S204). Even if the connection starting signal of the tag is not contained in the reception signal and the tag is determined as one that is newly detected after being compared with information of the ID memory apparatus 84 (S203), the processes after S204 are similarly performed.

Next, the central control apparatus 70 transmits the ID transmission request command to the tag 50 while adding the unique IDs of the base station 34 and the tag 50 itself contained in the ID memory apparatus 343 in order to obtain the detailed position information of the detected tag 50 (S209), and writes "ON" in the measurement flag section that is set for each unique ID in the ID memory apparatus 84 in order to show that the ID transmission is being requested, and then a time indicated by the timer 81 is written into the response delay time set for each unique ID in the ID memory apparatus 84.

Then, the central control apparatus 70 waits for a reply from the desired tag in response to the ID transmission request command using the unique ID of the target tag whose measurement flag is turned on and the related base station ID (S205). In the case where the reply to the ID transmission request command from the desired tag is confirmed by the similar ID confirmation operation, a difference between the time indicated by the timer at the time and the reply delay time set for the ID is rewritten into the reply delay time in the ID memory apparatus 84, and the measurement flag set for the ID is changed to IDle (S207). On the other hand, in the case where the measurement flag is not turned on in S205, the unique IDs of the base station and the tag itself are stored in the ID memory apparatus 84 (S206). If it is necessary to obtain the detailed position information of the tag, the measurement flag is turned on (S208), and the ID transmission request command is transmitted to the tag while adding the unique IDs of the base station and the tag itself contained in the ID memory apparatus 84 (S209).

Figure 21:
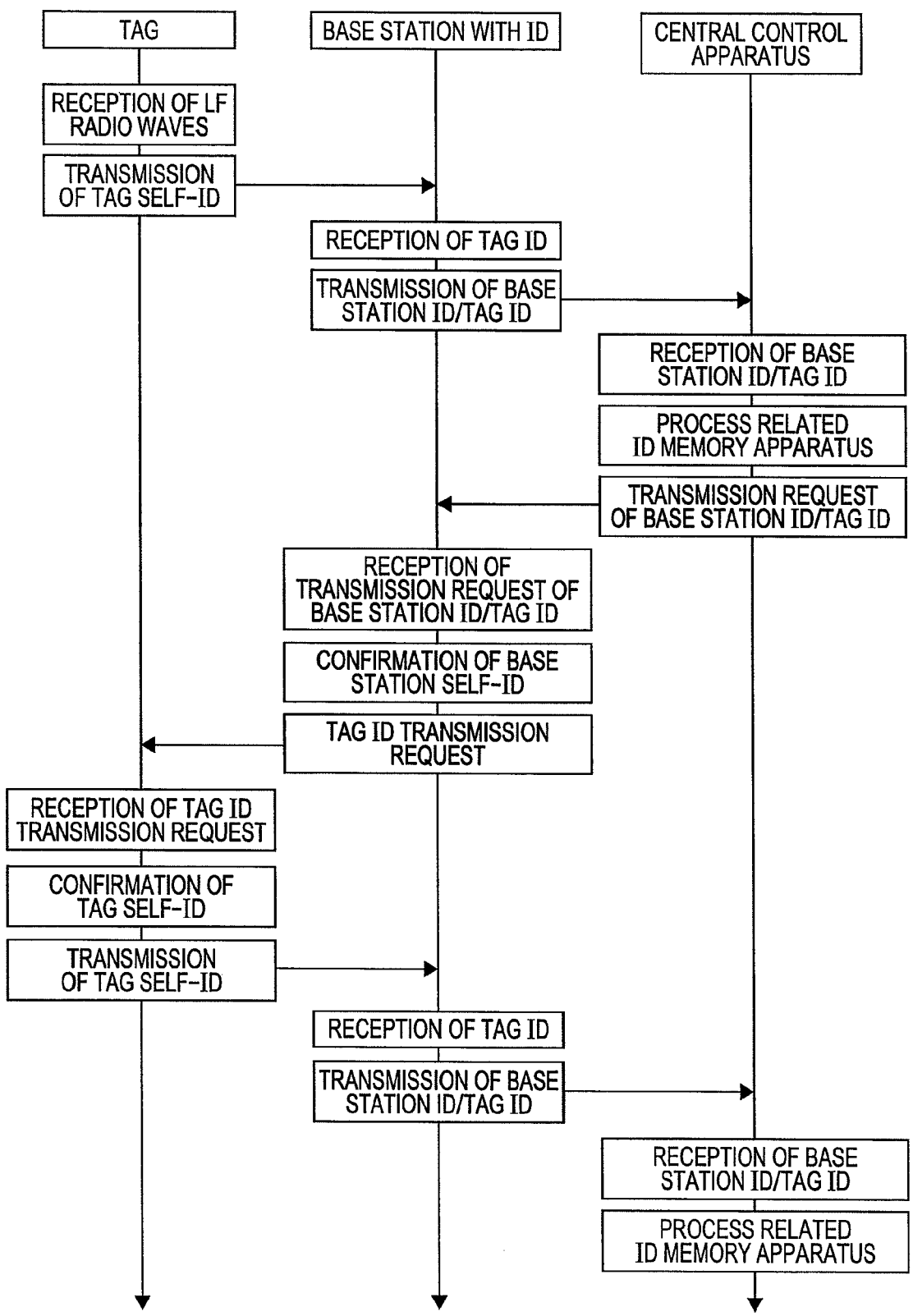
FIG. 21 is an example of a time chart of processes by the wireless tag, the base station, and the central control apparatus in the embodiment of FIG. 15.

FIG. 21 shows a time chart of a series of operations of the wireless tag 50, the transceivers 34 and the central control apparatus 70, shown in FIG. 19 and FIG. 20. Information of the wireless tags in the adjacent areas 40 where the wireless tags 50 and the transceivers 34 with base station IDs can communicate with each other using radio waves in the LF band and the RF band is transmitted to the central control apparatus 70 while adding the unique base station IDs. The central control apparatus 70 controls the information as "process related ID memory apparatus" using the format of the ID memory unit 84. Specifically, the central control apparatus 70 records the unique ID of each tag 50 coupled to the close-range detection system using the low/high frequency shared leakage antenna, the unique ID of the base station 34 with which the tag is communicating, and communication delay time from the time when a signal reaches the tag from the central control apparatus 70 through the base station to the time when the signal is returned to the central control apparatus through the base station. Accordingly, if geographical installation information of the low/high frequency shared leakage antenna is obtained in advance, the position of the tag can be more accurately detected on a divided-segment basis of the cable than detection on a cable-basis. Accordingly, the accuracy of the position detection of the object to which the wireless tag is added can be advantageously improved.

According to the embodiment, the position detection of the objects existing in plural areas that are linearly distributed and information communications can be realized, and thus management of products and workers on a line such as a production line can be advantageously realized.

Fourteenth Embodiment

Figure 22:
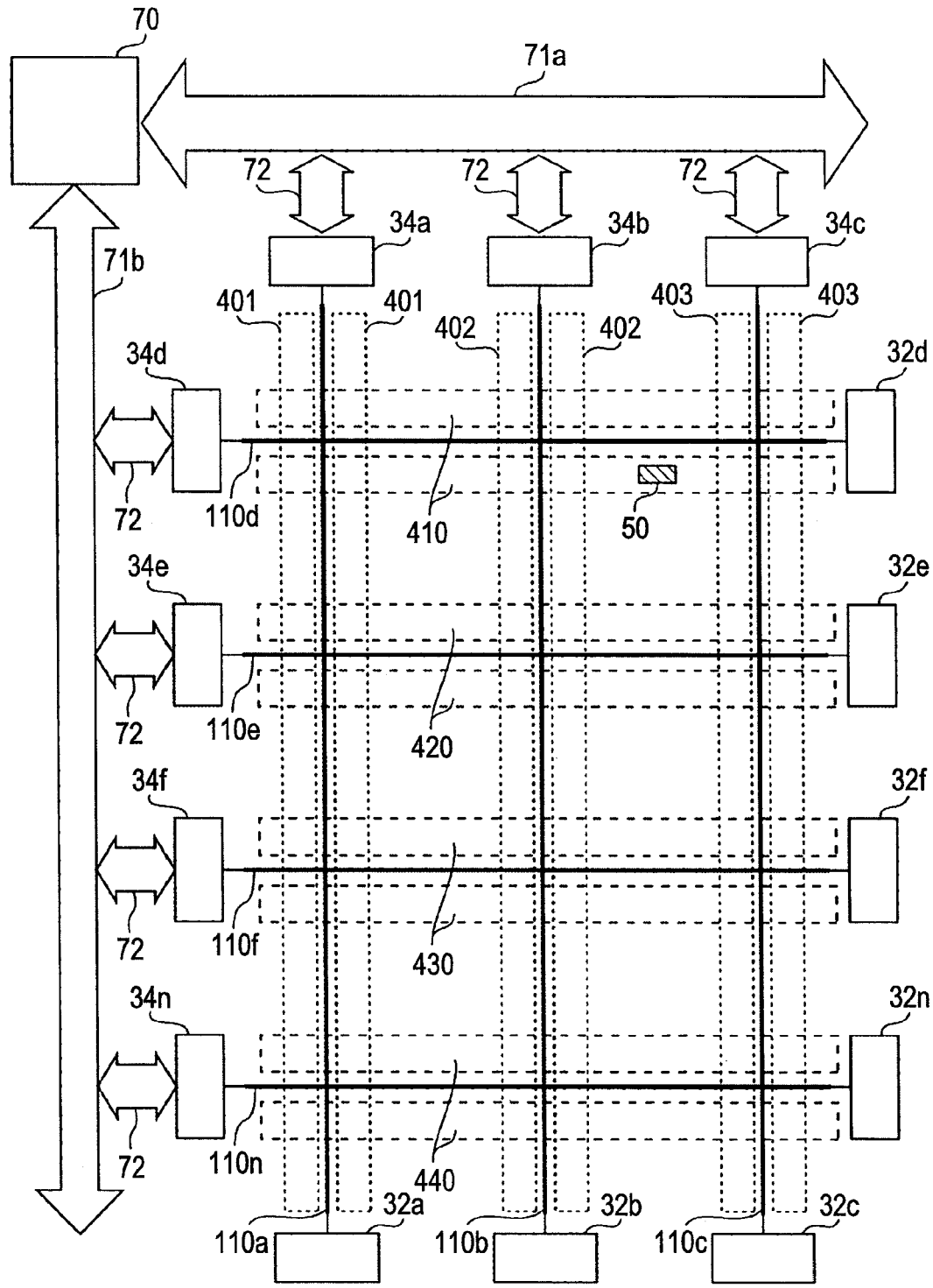
FIG. 22 is a configuration diagram of a close-range detection system using a low/high frequency leakage coaxial cable according to another embodiment of the present invention.

FIG. 22 is a diagram for showing another embodiment of the close-range detection system using the low/high frequency shared leakage antennas of the present invention. In the embodiment, the system of FIG. 15 is two-dimensionally extended. FIG. 22 is configured in the same manner as the embodiment of FIG. 15 except that three sets of three-conductor-structure antennas 110 (110a to 110n) and four sets of three-conductor-structure antennas 110 (110a to 110n) terminated by the termination circuits 32 (32a to 32n) are vertically and horizontally coupled in parallel, respectively, to the LF/RF transceivers 34 (34a to 34n) with base station IDs in a two-dimensional manner. In the embodiment, binary IDs are provided in advance to the adjacent areas 40 (401 to 403 and 410 to 440) where the wireless tags 50 and the LF/RF transceivers 34 with base station IDs can communicate with each other using radio waves in the LF band and the RF band, and the two-dimensional existing positions of the objects near the three-conductor-structure antenna are detected on the basis of the sum of the IDs of the LF/RF transceivers 34 that are vertically arranged and the IDs of the LF/RF transceivers 34 that are horizontally arranged.

According to the embodiment, it is not necessary to provide the function of measuring the reply delay time from the wireless tag for the LF/RF transceivers 34 with base station IDs, which is different from the thirteenth embodiment. In addition, it is not necessary to record the reply delay time in the format of the ID memory apparatus 84. Therefore, the two-dimensional positions of the objects can be easily detected, the cost incurred in system installation can be advantageously reduced.

What is claimed is:
1. A low/high frequency shared leakage antenna comprising:
   a high-frequency leakage coaxial cable having an inner conductor and an outer conductor;
   a termination circuit that terminates the inner conductor and the outer conductor in impedance at one end of the high-frequency leakage coaxial cable; and
   a loop structure of a conductor line that is arranged near the high-frequency leakage coaxial cable while being in parallel therewith to perform a communication of low-frequency signals, wherein a communication of high-frequency signals higher in frequency than the low-frequency signals is performed through the high-frequency leakage coaxial cable, and wherein the sensitivity of effective sensitivity areas for the low-frequency signals is reduced by the loop structure to allow electromagnetic waves of the low-frequency signals to locally exist around the loop structure.

2. The low/high frequency shared leakage antenna according to claim 1, wherein the loop structure comprises first and second conductor lines arranged near the high-frequency leakage coaxial cable respectively while being in parallel therewith, and wherein an impedance short circuit which short-circuits one end of the first conductor line and one end of the second conductor line is provided.

3. The low/high frequency shared leakage antenna according to claim 1, wherein the loop structure is configured using the conductor line arranged near the high-frequency leakage coaxial cable while being in parallel therewith and the inner conductor of the high-frequency leakage coaxial cable;

wherein there are provided a short-circuit path which short-circuits the inner conductor and the conductor line in impedance at a position corresponding to one end of the high-frequency leakage coaxial cable to form the loop structure, and a termination resistance which terminates the inner conductor and the outer conductor of the high-frequency leakage coaxial cable in impedance at the position corresponding to the one end of the high-frequency leakage coaxial cable;

wherein a first impedance matching circuit is coupled between the inner conductor and the conductor line at the other end of the high-frequency leakage coaxial cable in order to couple a low-frequency communication device for communicating signals in a low-frequency band; and wherein a second impedance matching circuit is coupled between the inner conductor and the outer conductor at the other end of the high-frequency leakage coaxial cable in order to couple a high-frequency communication device for communicating signals in a frequency band higher than that of the low-frequency communication device.

4. The low/high frequency shared leakage antenna according to claim 3, wherein the first impedance matching circuit is configured using a capacitor and a first inner resistance, and wherein the second impedance matching circuit is configured using a second inner resistance.

5. The low/high frequency shared leakage antenna according to claim 3, wherein a resonant circuit is coupled to the short-circuit path which short-circuits the inner conductor and the conductor line to form the loop structure.

6. The low/high frequency shared leakage antenna according to claim 3, wherein the conductor line arranged near the high-frequency leakage coaxial cable while being in parallel therewith is covered with a magnetic material.

7. The low/high frequency shared leakage antenna according to claim 3, wherein the low/high frequency shared leakage antenna having a three-conductor structure configured using the high-frequency leakage coaxial cable formed of the inner conductor and the outer conductor and the conductor line is laid in a closed-loop shape.

8. The low/high frequency shared leakage antenna according to claim 7, wherein the three-conductor-line structure includes a branching structure of the leakage coaxial cable having a stem structure and a branch structure.

9. The low/high frequency shared leakage antenna according to claim 1, wherein the loop structure is configured using the conductor line arranged near the high-frequency leakage coaxial cable while being in parallel therewith and the outer conductor of the high-frequency leakage coaxial cable;

wherein there are provided a short-circuit path which short-circuits the outer conductor and the conductor line in impedance at a position corresponding to one end of the high-frequency leakage coaxial cable to form the loop structure, and a termination resistance which terminates the inner conductor and the outer conductor of the high-frequency leakage coaxial cable in impedance at the position corresponding to the one end of the high-frequency leakage coaxial cable;

wherein a first impedance matching circuit is coupled between the outer conductor and the conductor line at the other end of the high-frequency leakage coaxial cable in order to couple a low-frequency communication device for communicating signals in a low-frequency band; and wherein a second impedance matching circuit is coupled between the inner conductor and the outer conductor at the other end of the high-frequency leakage coaxial cable in order to couple a high-frequency communication device for communicating signals in a frequency band higher than that of the low-frequency communication device.

10. A base station apparatus including a communication device and a low/high frequency shared leakage antenna, wherein the low/high frequency shared leakage antenna comprises:

a high-frequency leakage coaxial cable having an inner conductor and an outer conductor;

a termination circuit that terminates the inner conductor and the outer conductor in impedance at one end of the high-frequency leakage coaxial cable; and a loop structure of a conductor line that is arranged near the high-frequency leakage coaxial cable while being in parallel therewith to perform a communication of low-frequency signals using the communication device, wherein a communication of high-frequency signals higher in frequency than the low-frequency signals is performed using the communication device through the high-frequency leakage coaxial cable; and wherein the sensitivity of effective sensitivity areas for the low-frequency signals is reduced by the loop structure to allow electromagnetic waves of the low-frequency signals to locally exist around the loop structure.

11. The base station apparatus according to claim 10, wherein the loop structure is configured using the conductor line arranged near the high-frequency leakage coaxial cable while being in parallel therewith and the inner conductor of the high-frequency leakage coaxial cable;

wherein there are provided a short-circuit path which short-circuits the inner conductor and the conductor line in impedance at a position corresponding to one end of the high-frequency leakage coaxial cable to form the loop structure, and a termination resistance which terminates the inner conductor and the outer conductor of the high-frequency leakage coaxial cable in impedance at the position corresponding to the one end of the high-frequency leakage coaxial cable;

wherein a first impedance matching circuit is coupled between the inner conductor, the conductor line, and the communication device at the other end of the high-frequency leakage coaxial cable; and wherein a second impedance matching circuit is coupled between the inner conductor, the outer conductor, and the communication device at the other end of the high-frequency leakage coaxial cable.

12. The base station apparatus according to claim 10, wherein the loop structure is formed of first and second conductor lines arranged near the high-frequency leakage coaxial cable while being in parallel therewith;

wherein the second conductor line of the loop structure is shared with the outer conductor of the high-frequency leakage coaxial cable;

wherein there are provided a short-circuit path which short-circuits the outer conductor and the first conductor line at a position corresponding to one end of the high-frequency leakage coaxial cable, and a termination resistance which terminates the inner conductor and the outer conductor of the high-frequency leakage coaxial cable in impedance at the position corresponding to the one end of the high-frequency leakage coaxial cable;

wherein a first impedance matching circuit is coupled between the outer conductor, the first conductor line, and the communication device at the other end of the high-frequency leakage coaxial cable; and wherein a second impedance matching circuit is coupled between the inner conductor, the outer conductor, and the communication device at the other end of the high-frequency leakage coaxial cable.

13. The base station apparatus according to claim 10, wherein the low-frequency signals are mainly used for position detection of an object, and wherein the high-frequency signals are mainly used for information communications.

14. The base station apparatus according to claim 10, wherein the high-frequency leakage coaxial cable is laid in a branching structure shape having a stem structure and a branch structure;

wherein a variable reactance circuit and a variable resistance are coupled in series to an end of the high-frequency leakage coaxial cable corresponding to the branch structure for the high-frequency signals; and wherein a variable resistance is coupled to the end of the high-frequency leakage coaxial cable corresponding to the branch structure for the low-frequency signals.

15. The base station apparatus according to claim 10, wherein the high-frequency leakage coaxial cable is laid in a branching structure shape having a stem structure and a branch structure;

wherein a variable reactance circuit and a variable resistance are coupled in parallel to an end of the high-frequency leakage coaxial cable corresponding to the branch structure for the high-frequency signals; and wherein a variable resistance is coupled to the end of the high-frequency leakage coaxial cable corresponding to the branch structure for the low-frequency signals.

16. A close-range detection system comprising: a base station apparatus having a communication device and a low/high frequency shared leakage antenna; a central control apparatus; and a wireless tag, wherein the communication device includes a low-frequency communication device which communicates low-frequency signals and a high-frequency communication device which communicates high-frequency signals higher than that of the low-frequency communication device;

wherein the low/high frequency shared leakage antenna comprises:

a high-frequency leakage coaxial cable having an inner conductor and an outer conductor;

a termination circuit that terminates the inner conductor and the outer conductor in impedance at one end of the high-frequency leakage coaxial cable; and a loop structure that is formed of a conductor line arranged near the high-frequency leakage coaxial cable while being in parallel therewith;

wherein a part of the loop structure is shared with either of the inner conductor and the outer conductor of the high-frequency leakage coaxial cable;

wherein the low/high frequency shared leakage antenna has a three-conductor structure formed of the high-frequency leakage coaxial cable and the conductor line of the loop structure;

wherein the wireless tag includes an antenna sensitive to the high-frequency signals and the low-frequency signals, a high-frequency receiver circuit, and a low-frequency receiver circuit;

wherein the central control apparatus reduces the sensitivity of effective sensitivity areas for the low-frequency signals with the loop structure of the low/high frequency shared leakage antenna to allow electromagnetic waves of the low-frequency signals to locally exist around the low/high frequency shared leakage antenna; and wherein the position of the wireless tag near the low/high frequency shared leakage antenna is detected using the low-frequency signals of the communication device, and wherein information communications with the wireless tag are performed using the high-frequency signals.

17. The close-range detection system according to claim 16, wherein the wireless tag has a unique ID, and communicates the unique ID using magnetic-field components of electromagnetic waves of the low-frequency signals, so that the base station apparatus detects the position of the wireless tag.

18. The close-range detection system according to claim 17, wherein there exist a plurality of wireless tags having the unique IDs and base station apparatuses;

wherein each base station apparatus has a unique ID; and wherein each base station apparatus transmits a reception signal from the wireless tag having the unique ID to the single central control apparatus together with the unique ID of the wireless tag while adding the unique self-ID of the base station apparatus.

19. The close-range detection system according to claim 17, wherein the central control apparatus includes an ID memory apparatus;

wherein the central control apparatus transmits a wireless-tag-unique-ID transmission command to the wireless tag using the low-frequency signals;

wherein the wireless tag replies the unique self-ID using the low-frequency signals in response to the unique ID transmission command;

wherein the base station apparatus receives the transmission signal from the wireless tag, and retransmits a signal to the central control apparatus while multiplexing the reception signal with the unique ID of the base station apparatus; and wherein the central control apparatus includes a unit of measuring a delay time up to the time when a reply signal from the wireless tag is received.

20. The close-range detection system according to claim 17, wherein the low/high frequency shared leakage antenna includes two sets of close-range detection systems which are linearly arranged in parallel;

wherein the two sets of close-range detection systems are arranged to be orthogonal to each other in a two-dimensional manner; and wherein the central control apparatus controls these systems.

* * * * *